United States Patent
Ng et al.

(10) Patent No.: US 11,648,847 B1
(45) Date of Patent: May 16, 2023

(54) METHODS AND SYSTEMS FOR REMOTE CHARGING OF WORK VEHICLES USING RECHARGE VEHICLES

(71) Applicant: DIMAAG-AI, Inc., Fremont, CA (US)

(72) Inventors: Fuk Ho Pius Ng, Portland, OR (US); Ian Wright, Woodside, CA (US)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

(21) Appl. No.: 17/651,375

(22) Filed: Feb. 16, 2022

(51) Int. Cl.
| | |
|---|---|
| *B60L 53/68* | (2019.01) |
| *B60L 58/12* | (2019.01) |
| *B60L 53/36* | (2019.01) |
| *B60L 53/16* | (2019.01) |
| *H02J 7/00* | (2006.01) |
| *B60L 53/53* | (2019.01) |
| *B60L 53/62* | (2019.01) |
| *H02J 7/34* | (2006.01) |
| *B60L 53/30* | (2019.01) |

(52) U.S. Cl.
CPC .............. *B60L 53/68* (2019.02); *B60L 53/16* (2019.02); *B60L 53/305* (2019.02); *B60L 53/36* (2019.02); *B60L 53/53* (2019.02); *B60L 53/62* (2019.02); *B60L 58/12* (2019.02); *H02J 7/0013* (2013.01); *H02J 7/0048* (2020.01); *H02J 7/342* (2020.01)

(58) Field of Classification Search
CPC ........ B60L 53/68; B60L 53/16; B60L 53/305; B60L 53/36; B60L 53/53; B60L 53/62; B60L 58/12
See application file for complete search history.

(56) References Cited

U.S. PATENT DOCUMENTS

2018/0290561 A1\* 10/2018 Baumgärtner ........ B60L 53/126
2020/0331547 A1\* 10/2020 Kowalchuk ............. B60K 1/00

FOREIGN PATENT DOCUMENTS

WO    WO-2016161216 A1 \* 10/2016 ............... B60D 1/36

\* cited by examiner

*Primary Examiner* — David V Henze-Gongola
(74) *Attorney, Agent, or Firm* — Polygon IP, LLP

(57) ABSTRACT

Described herein are methods and systems for remote charging of work vehicles using recharge vehicles. A recharge vehicle is equipped with power storage that has a sufficient capacity for propelling the recharge vehicle between a charging station (used for charging the recharge vehicle) and a work location (of the work vehicle) and also for charging the work vehicle at the work location. In some examples, the charging of the work vehicle and even the connection between the vehicles are formed while the work vehicle continues to operate. This approach helps to maximize the operating time of the work vehicle. Furthermore, this approach relaxes the charge rate requirement for charging the recharge vehicle and also for charging the work vehicle as well as the location of the charging station (for charging the recharge vehicle). In some examples, work vehicles and/or recharge vehicles are autonomous vehicles and use vehicle-to-vehicle coordination features.

20 Claims, 13 Drawing Sheets

METHODS AND SYSTEMS FOR REMOTE CHARGING OF WORK VEHICLES USING RECHARGE VEHICLES

BACKGROUND

Electric vehicles are powered by onboard batteries and use this power to propel and/or to perform various tasks. These batteries can include multiple electrochemical cells arranged into battery modules and/or packs. When the battery's state of charge (SOC) goes below a certain minimal level, the battery needs to be recharged for the electrical vehicle to continue the operation. This recharge operation typically involves travel from the vehicle's operating location to the vehicle's charging location, charging for some time at the charging location, and return travel to the operating location. During all this travel and charging, the vehicle typically does not perform any tasks, which can take significant time away from the actual working operations. As a result of this non-operating time, applications of electrical vehicles have been limited. For example, many farming applications may require a near-constant operation of vehicles, which has been possible when internal combustion engines (ICEs) are used. Specifically, the fuel (e.g., diesel) for these ICE vehicles can be provided onsite during a short period (e.g., minutes).

While some charging stations can provide rapid charging, such charging stations typically require major power line infrastructures that are often not available (e.g., in rural areas). Furthermore, such charging stations can be capital intensive. Rapid charging can also require special batteries and supporting equipment (e.g., inverters, cooling systems), which can greatly increase the cost of electric vehicles. Also, electrical vehicles still need to travel to these stations from their work locations and remain idle while being charged at these stations. While replaceable/removable batteries have been proposed for some applications, these batteries can be heavy and typically require special handling equipment. For example, a weight of 100 kWh battery can be 500-800 kg depending on the construction and features.

What is needed are new methods and systems for remote (e.g., on-site) charging of work vehicles using recharge vehicles.

SUMMARY

Described herein are methods and systems for remote charging of work vehicles using recharge vehicles. A recharge vehicle is equipped with power storage that has a sufficient capacity for propelling the recharge vehicle between a charging station (used for charging the recharge vehicle) and a work location (of the work vehicle) and also for charging the work vehicle at the work location. In some examples, the charging of the work vehicle and even the connection between the vehicles are formed while the work vehicle continues to operate. This approach helps to maximize the operating time of the work vehicle. Furthermore, this approach relaxes the charge rate requirement for charging the recharge vehicle and also for charging the work vehicle as well as the location of the charging station (for charging the recharge vehicle). In some examples, work vehicles and/or recharge vehicles are autonomous vehicles and use vehicle-to-vehicle coordination features.

Provided is a method of remote charging of a work vehicle, comprising a work-vehicle power storage, using a recharge vehicle, comprising a recharge-vehicle power storage. In some examples, the method comprises receiving a work-vehicle state of charge of the work-vehicle power storage; determining charging-start time and charging-start location, for charging the work-vehicle power storage, based on at least the work-vehicle state of charge; dispatching the recharge vehicle to the charging-start location by the charging-start time; forming an electrical connection between the work vehicle and the recharge vehicle at the charging-start time and at the charging-start location; charging the work-vehicle power storage from the recharge-vehicle power storage through the electrical connection; and interrupting the electrical connection between the work vehicle and the recharge vehicle.

In some examples, the charging-start time and the charging-start location are determined further based on at least one of a work-vehicle current location of the work vehicle, a recharge-vehicle current location of the recharge vehicle, a recharge-vehicle state of charge of the recharge-vehicle power storage, and a work-vehicle operating schedule of the work vehicle.

In some examples, receiving the work-vehicle state of charge and determining the charging-start time and the charging-start location is performed at an external vehicle controller, communicatively coupled to at least one of the work vehicle and the recharge vehicle. In the same or other examples, receiving the work-vehicle state of charge and determining the charging-start time and the charging-start location is performed at the recharge vehicle.

In some examples, the method further comprises forming a direct communication channel between the work vehicle and the recharge vehicle at least prior to forming the electrical connection between the work vehicle and the recharge vehicle. For example, the direct communication channel is formed before receiving the work-vehicle state of charge of the work-vehicle power storage. The work-vehicle state of charge is received at the recharge vehicle through the the direct communication channel. In some examples, the direct communication channel is used to transfer at least one of a work-vehicle current location of the work vehicle, a work-vehicle steering input of the work vehicle, a work-vehicle speed of the work vehicle, and electrical connection instruction for forming the electrical connection between the work vehicle and the recharge vehicle. For example, the work-vehicle current location comprises a relative location of the work vehicle to the recharge vehicle. The relative location of the work vehicle to the recharge vehicle can be determined using at least one of work-vehicle sensors of the work vehicle and recharge-vehicle sensors of the recharge vehicle. The relative location of the work vehicle to the recharge vehicle can be continuously updated while forming the electrical connection and charging the work-vehicle power storage.

In some examples, the work vehicle and the recharge vehicle synchronously move while charging the work-vehicle power storage from the recharge-vehicle power storage to ensure that the electrical connection between the work vehicle and the recharge vehicle remains intact. For example, the work vehicle and the recharge vehicle synchronously move while forming the electrical connection between the work vehicle and the recharge vehicle at the charging-start time and at the charging-start location. In some examples, a work-vehicle track of the work vehicle overlaps with a recharge-vehicle track of the recharge vehicle when the work vehicle and the recharge vehicle synchronously move while charging the work-vehicle power storage from the recharge-vehicle power storage. For example, the recharge vehicle moves in front of the work vehicle while charging the work-vehicle power storage from the recharge-vehicle power storage.

In some examples, the work vehicle is a human-controlled vehicle. The recharge vehicle is an autonomous vehicle. The recharge-vehicle steering system of the recharge vehicle is controlled based on driver input to the work-vehicle steering system of the work vehicle while the recharge vehicle moves in front of the work vehicle.

Alternatively, each of the work vehicle and the recharge vehicle is an autonomous vehicle. The movement of the work vehicle is based on the movement of the recharge vehicle while the recharge vehicle moves in front of the work vehicle. In some examples, the movement of the work vehicle corresponds to the movement of the recharge vehicle with a set delay determined based on speed and size of the work vehicle and the recharge vehicle.

In some examples, the work vehicle moves in accordance with a work-vehicle operating schedule of the work vehicle while charging the work-vehicle power storage from the recharge-vehicle power storage. The recharge vehicle moves based on the movement of the work vehicle while charging the work-vehicle power storage from the recharge-vehicle power storage.

In some examples, receiving the work-vehicle state of charge and determining the charging-start time and the charging-start location are repeated one or more times before forming the electrical connection.

Also provided is a a vehicle charging system comprising a work vehicle and a recharge vehicle. The work vehicle comprises a work-vehicle power storage, a work-vehicle communication system, and a work-vehicle charging port. The recharge vehicle comprises a recharge-vehicle power storage, a recharge-vehicle communication system configured to communicate with the work-vehicle communication system, and a recharge-vehicle charging port, configured to form an electrical connection with the work-vehicle charging port and transmit electrical power from the recharge-vehicle power storage to the work-vehicle power storage while the work vehicle and the recharge vehicle synchronously move relative to each other.

DETAILED DESCRIPTION

Figure 1A:
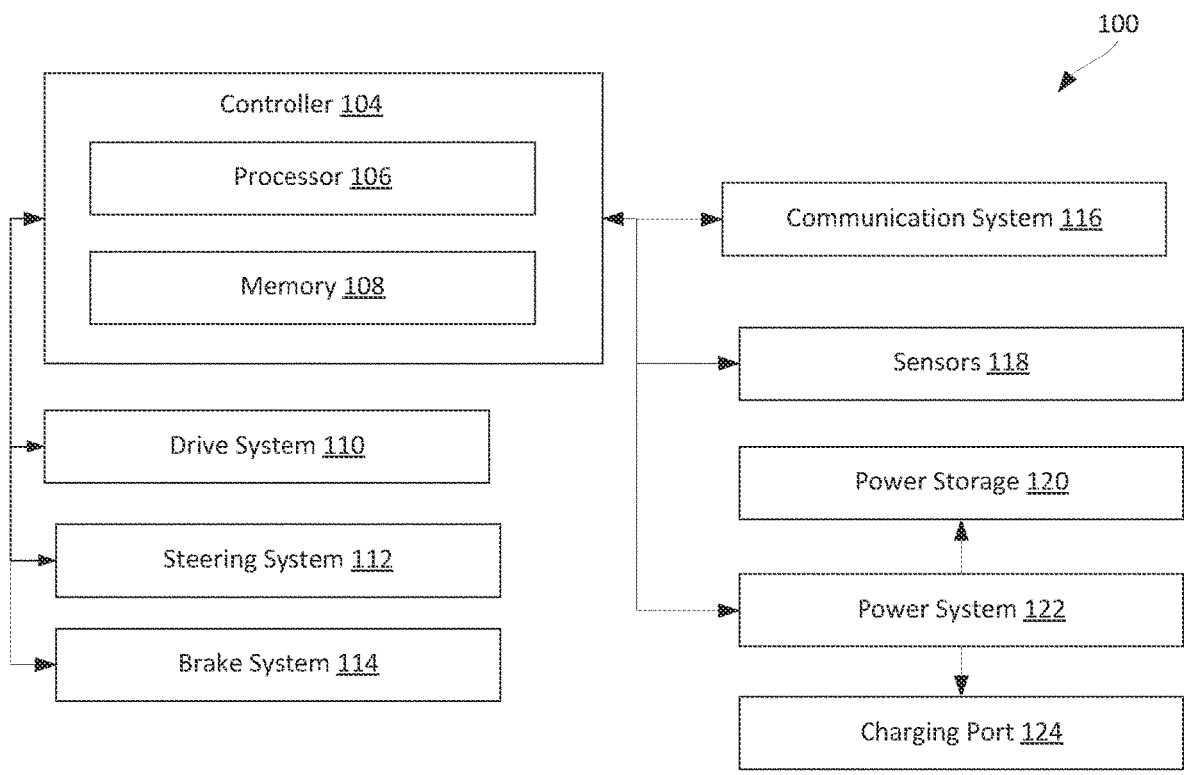
FIG. 1A is a block diagram of an electric vehicle with optional autonomous capabilities, in accordance with some examples.

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

INTRODUCTION

As noted above, charging electric vehicles requires time and charging infrastructure. The charging time depends on available charge rates and battery capacity or, more generally, the amount of electrical energy that needs to be transferred to the electric vehicle. While fast charging (e.g., charging rates exceeding 100 kW) is desirable, it is not always available. Charge rates depend on the battery and vehicle design (e.g., electrochemically active materials, cooling, wiring, and supporting circuitry) and charging infrastructure accessible to the vehicle. At the same, electric vehicles can be deployed away from charging infrastructure that can provide reasonable charge rates. The travel time (between the work and charging locations) and charging time can often limit utility and new applications of electric vehicles. Specifically, many industrial applications (e.g., farming, construction) greatly depend on high vehicle utilization.

Described herein are methods and systems for remote charging of work vehicles using recharge vehicles. Various examples of work vehicles within the scope, e.g., tractors and other farming equipment, construction equipment, and the like. A work vehicle is an electric vehicle that operates at a work location (e.g., a farm field, a construction site). This work location can be away from a charge location (e.g., a charging station). Instead of traveling to the charge location every time the battery's SOC of the work vehicle drops below a certain threshold, a recharge vehicle is deployed to the work location for charging the work vehicle. The recharge vehicle is equipped with power storage that has a sufficient capacity for propelling the recharge vehicle between the charge and work locations and also for charging the work vehicle at the work location. In some examples, the same recharge vehicle is configured to charge multiple work vehicles at the same or different work locations (e.g., one work vehicle at a time) before the recharge vehicle needs to return for its own recharge at the charging station.

The recharge vehicle can be deployed to the work location upon receiving the SOC data from the work vehicle (e.g., the work vehicle's SOC being below a set threshold). The work vehicle remains at the work location, e.g., a charging-start location is picked up along the work-vehicle route. The recharge vehicle travels to the work location and forms an electrical connection with the work vehicle at the charging-start location to charge the work vehicle. In some examples, the charging of the work vehicle and even the connection between the vehicles are formed while the work vehicle continues to operate, e.g., continue performing various tasks in accordance with a work-vehicle operating schedule that may involve work-vehicle movement along a set route. This approach may be referred to as "on-the-go" charging. As noted above, this approach helps to maximize the operating time of the work vehicle. The work vehicle can continue its operation while being charged, e.g., move while being charged. In these examples, the recharge vehicle moves together in a synchronized manner with the work vehicle to preserve the electrical connections. For example, the work and recharge vehicle may be equipped with various vehicle-to-vehicle coordination features (provided by vehicle sensors) to enable this synchronized movement.

In some examples, the recharge vehicle and work vehicle are specifically configured for fast charging of the work vehicle from the recharge vehicle, which is referred to as a work-vehicle charging rate. For example, the work-vehicle charging rate can be at least 350 kW or even at least 600 kW (e.g., at rates between 5C-15C with "C" representing a full battery capacity—i.e., 1C corresponding to a rate requiring 1 hr to fully charged a fully discharged battery). The fast charging ensures that the time during which the recharge vehicle and work vehicles need to remain connected is minimized. It should be noted that the electrical connection between the recharge vehicle and work vehicle may require the work vehicle to stop its operation or at least require very synchronize movement of the two vehicles (to maintain the electrical connection). In some examples, the charging time of the work vehicle is between 6 minutes and 12 minutes depending on the charge rate. This work-vehicle charging rate and time should be distinguished from the charging rate and time of the recharge vehicle when connected to a charging station. In some examples, the recharge-vehicle charging rate from the Level 2 charging station is between 3 kW and 19 kW at 208-240V. While, Level 3 chargers can supply 350-450 kW, such chargers require an industrial power infrastructure and rather complex and expensive equipment, which is often not available in various areas (e.g., farming communities). The recharge-vehicle charging time from the charging station can be greater than 0.5 hours (with the fastest DC Fast Charger) or even greater than 5 hours (with the fastest Level 2 AC Charger).

It should be noted that charging a work vehicle from a recharge vehicle allows deploying the work vehicle in remote areas (from a charging station) without sacrificing the operating time of the work vehicle (e.g., to return for recharge). In other words, this approach provides scalable deployments of electric vehicles. Furthermore, decoupling work vehicles from charging stations allows using charging stations with small charging rates (e.g., typical utility connection points) without sacrificing work-vehicle operating time. Finally, using a recharge vehicle reduces the need for large-capacity batteries on work vehicles thereby reducing the cost and weight of work vehicles. In some examples, the capacity of a work-vehicle battery is between 30 kWh and 200 kWh or, more specifically, between 50 kWh and 100 kWh. A work vehicle can be charged frequently. The capacity of a recharge-vehicle battery can be between 50 kWh and 500 kWh or, more specifically, between 100 kWh and 300 kWh. This large capacity allows the same recharge vehicle to charge multiple work vehicles and/or to travel large distances between charging stations and work vehicles.

For purposes of this disclosure, the term "electric vehicle" (EV) refers to a motored vehicle powered by a battery. Some examples of electrical vehicles include, but are not limited to, ground vehicles that travel on the ground, underground vehicles that travel in tunnels or mines under the ground, aerial vehicles that travel in air, space vehicles that travel in space, water vehicles that travel on water, underwater vehicles that travel underwater, and various other vehicles that travel according to various combinations of various travel methods listed above.

An autonomous vehicle (AV) or, more specifically, an autonomous electric vehicle (AEV) is defined as a vehicle that travels without a human driver and performs tasks, adapts, and takes actions to the travel conditions. An AEV can also be called an unmanned electric vehicle. In comparison to a manned EV, an AEV is equipped with special equipment capable of navigating the AEV in the environment. Various examples of this equipment are described below with reference to the operations of work and recharge vehicles. A specific example of an AEV is a remote-operated EV, which is defined as a vehicle that travels with a human operator handling controls from a remote location (away from the vehicle) and performs tasks, adapts, and takes actions to the travel conditions. A remote-operated EV is different from a fully-autonomous EV, which does not require any real-time human intervention while operating the fully-autonomous EV (not at the vehicle or remotely).

A manned EV, which can be also referred to as a human-driven electric vehicle, can be equipped with various user input components, such as a steering input component (e.g., a steering wheel), a speed input component (e.g., a brake pedal, an accelerator pedal), and the like. It should be noted that a work vehicle and/or a recharge vehicle can be either an AEV or a manned EV. For example, both work and recharge vehicles can be AEVs. In another example, a work vehicle can be an AEV, while a recharge vehicle can be a manned EV. In yet another example, a work vehicle can be a manned EV, while a recharge vehicle can be an AEV. Finally, both work and recharge vehicles can be manned EVs. It should be noted that the same vehicle charging system can have multiple work vehicles such that (1) all are AEVs, (b) all are manned EVs, or (c) a combination of AEVs and manned EVs. Similarly, the same vehicle charging system can have multiple recharge vehicles such that (1) all are AEVs, (b) all are manned EVs, or (c) a combination of AEVs and manned EVs. Overall, a vehicle charging system can have any number of work vehicles and recharge vehicles.

As used herein, the term "battery" generally refers to a rechargeable power storage that draws and stores power when connected to an external power source and supplies power to various connected systems for normal operations. In some examples, a battery comprises a rechargeable battery, such as a lithium-ion battery, a lithium-ion polymer battery, a lead-acid battery, a nickel-cadmium battery, a nickel-metal hydride battery, a solid-state battery, or the likes.

As used herein, the terms "charging" and "recharging" are used interchangeably and refer to supplying power to recharge a battery. The stored energy (i.e., battery's SOC) is increased when charging the battery. The stored energy is available for various operations, e.g., propelling the EV, charging another EV, performing various operations associated with work vehicles, and the like.

Charging can be wired charging or wireless charging. The term "wireless charging" refers to supplying power to recharge a battery without direction connections using wired cables. Wireless charging is realized by a wireless charger system that generates an electromagnetic field for transmitting electrical energy. For example, the wireless charger may comprise an inductive coil and/or a charging pad that sends out an electromagnetic wave signal, e.g., to be wirelessly transmitted to a receiving device (e.g., on an electrical vehicle).

The term "charging port" refers to a connection socket or a plug or the likes that can be connected to a corresponding/complementary device to transmit the power between two devices (e.g., from a charging station to a recharge vehicle, from a recharge vehicle to a work vehicle). In some examples, the power supplied through a charging port is delivered to a battery of the EV for future use. This power supply and distribution operation at the EV is managed by a power system.

The term "charging port support" refers to a device configured to support and, in some examples, to articulate a charging port. For example, the charging port support can comprise a telescopic extender with a charging port positioned at the end of the telescopic extender. In the same or other examples, the charging port support comprises a flexible cable that supplies the power to the charging port. For example, the telescopic extender can first extend from the EV to form an electrical connection between the charging port and another component. The telescopic extender can then retract leaving the charging port connected and the flexible cable extending from the charging port to the EV. The flexible cable allows some degree of mobility between the EV and another component to which this EV is connected. For example, a recharge vehicle may be connected to a work vehicle. The flexible cable extends between these vehicles allowing the vehicles to move together.

The term "work vehicle" refers to an EV or, more specifically, to an AEV that travels, performs various operations (e.g., farming operations, constructions operations), and is charged using a recharge vehicle. In some examples, the charging port of the work vehicle is configured to form and/or maintain the electrical connection to another EV (e.g., a recharge vehicle) while the work vehicle continues its operation. This feature may be referred to as "on-the-go recharging" and is further described below. Various systems on both vehicles can be used to coordinate the process of forming, maintaining, and severing the electrical connection. It should be noted that a work vehicle can be also charged directly from a charging station in specific examples. Furthermore, in some examples, a work vehicle may be operable as a recharge vehicle.

The term "recharge vehicle" refers to an EV or, more specifically, an AEV that travels and performs various operations (e.g., being charged from a charging station (or another EV) and charging another EV). In some examples, a charging system is included in a recharge vehicle along with an additional charging connector to support the on-the-go recharging.

Electrical Vehicle Examples

FIG. 1A is a block diagram illustrating various components of EV 100, in accordance with some examples. As noted above EV can be an AEV (e.g., fully autonomous, semi-autonomous with part human assistance, and remote-operated by a human) and can be operated as a work vehicle or as a recharge vehicle. Some examples of EV 100 include, but are not limited to, ground vehicles that travel on the ground, underground vehicles that travel in tunnels or mines under the ground, aerial vehicles that travel on air, space vehicles that travel in space, water vehicles that travel on water, underwater vehicles that travel underwater, and vehicles that combine various forms of travel listed earlier. For example, EV 100 can be a farming vehicle such as a tractor. Unlike conventional ICE tractors, electric tractors can provide substantial fuel and maintenance cost savings, reduced noise and pollution, provide various novel drivetrain options, improved tractions, maneuverability, and other benefits.

Referring to FIG. 1A, EV 100 comprises controller 104, drive system 110, steering system 112, braking system 114, communication system 116, sensors 118, power system 122, power storage 120, and charging port 124. Controller 104 is used for controlling other components while EV 100 performs various operations, such as traveling between locations, forming electrical connections, charging, performing work operations, and the like. In some examples, controller 104 comprises processor 106 and memory 108. Processor 106 can include a microprocessor, an application-specific integrated circuit, and the like and can be configured to execute computer-readable instructions stored on memory 108. Memory 108 includes read-only memory (ROM) and random-access memory (RAM). Memory 108 may be included in an operating system and various instructions (e.g., computer-readable instructions, applications, data, program modules) for controlling the above-referenced components and performing various operations of EV 100. Specifically, controller 104 may be connected to and control operations of one or more of communication system 116, sensors 118, power system 122, drive system 110, steering system 112, and brake system 114.

Communication system 116 can include circuitry and instructions for forming communication channels between EV 100 and other external devices, e.g., other EVs, computer systems, cloud servers, or the like. Various types of communication channels are within the scope, such as Global System for Mobile (GSM), General Packet Radio Service (GPRS), Enhanced Data Rates for GSM Evolution (EDGE), High-Speed Downlink Packet Access (HSDPA), Long-Term Evolution (LTE), Code-division multiple access (CDMA), Wideband Code-division multiple access (WCDMA), User Datagram Protocol (UDP), Transmission Control Protocol/Internet Protocol (TCP/IP), Short Message Service (SMS), Wireless Application Protocol (WAP), Ultra-wideband (UWB), Worldwide Interoperability for Microwave Access (WiMAX), Session Initiation Protocol Real-time Transport Protocol (SIP/RTP), or any of a variety of other communication protocols. In some examples, communication system 116 may be used to form a peer-to-peer network or a wireless local area network with other EVs, computer systems, or the like. Communication system 116 may be used to send the status data or the likes from EV 100 to one or more external systems and may be used to receive task assignments, navigation instructions, global positioning system (GPS) location information, or the likes at EV 100.

Sensors 118 comprises one or more cameras, lidars, radars, GPS location sensor, infrared sensors, accelerometer, gyroscope, altitude sensor, wind sensor, light sensor, visibility sensor, weather sensor, barometric pressure sensor, range sensor, humidity sensor, audio sensors, thermal image sensor, night vision sensor, or the like. Sensors 118 can be used by EV 100 to determine the location of EV 100 relative to the environment and, more specifically, relative to other EVs.

Power storage 120 may comprise a battery configured to store and supply power to various components of EV 100. In some examples, power storage 120 may comprise a rechargeable battery, such as a lithium-ion battery, lithium-ion polymer battery, a lead-acid battery, a nickel-cadmium battery, a nickel-metal hydride battery, a solid-state battery, or the like. In some examples, power storage 120 comprises a lithium-titanium-oxide (LTO) battery, which is capable of handling high rates over many cycles. While LTO batteries have limited energy density, this limitation is overcome by more frequent charging of the battery without interrupting EV operations.

Power system 122 may comprise circuitry designed to draw the power from power storage 120 and supply this power to other components of EV 100. For example, power system 122 can power controller 104, processor 106, memory 108, drive system 110, steering system 112, braking system 114, communication system 116, and sensors 118. Power system 122 draws the electric power from power storage 120. Power system 122 is configured to connect to an external power supply (e.g., another EV, charging station) using charging port 124. When the external power supply is connected to charging port 124, power system 122 draws power from this external power supply and recharges power storage 120. Some examples of the external power supply include, but are not restricted to, an external power generator, a power grid (e.g., supplying an alternating current), a DC-AC converter (e.g., supplying an alternating current from external power storage), an AC-DC converter (e.g., supplying a direct current, after converting an alternating current from a power grid), or external power storage (e.g., supplying a direct current).

Drive system 110 may comprise one or more electric motors that control the speed, direction, orientation, or the likes of EV 100. Drive system 110 may be controlled by controller 104 to move EV 100 in designated directions and with designated speeds.

Steering system 112 may comprise one or more implements to control the angle of one or more wheels of EV 100. Steering system 112 may be controlled by controller 104 to change the direction of EV 100, e.g., towards the designated directions. In some examples, steering system 112 may comprise actuators, servo motors, stepper motors, dc motors, or the like.

Braking system 114 may comprise of one or more implements to apply brakes on one or more wheels of EV 100. Braking system 114 may be controlled by controller 104 to reduce the rotary speed of the wheels, thereby reducing the speed of EV 100 or thereby bringing EV 100 to a complete stop. In some examples, braking system 114 may comprise of a hydraulic system, a mechanical system, a compressed air system, or the like to brake using one or more of the drum brakes, disk brakes, or the like.

Other components of EV 100 may depend on the application and EV type (e.g., a work vehicle, a recharge vehicle) as further described below.

Work Vehicle and Recharge Vehicle Examples

Figure 1B:
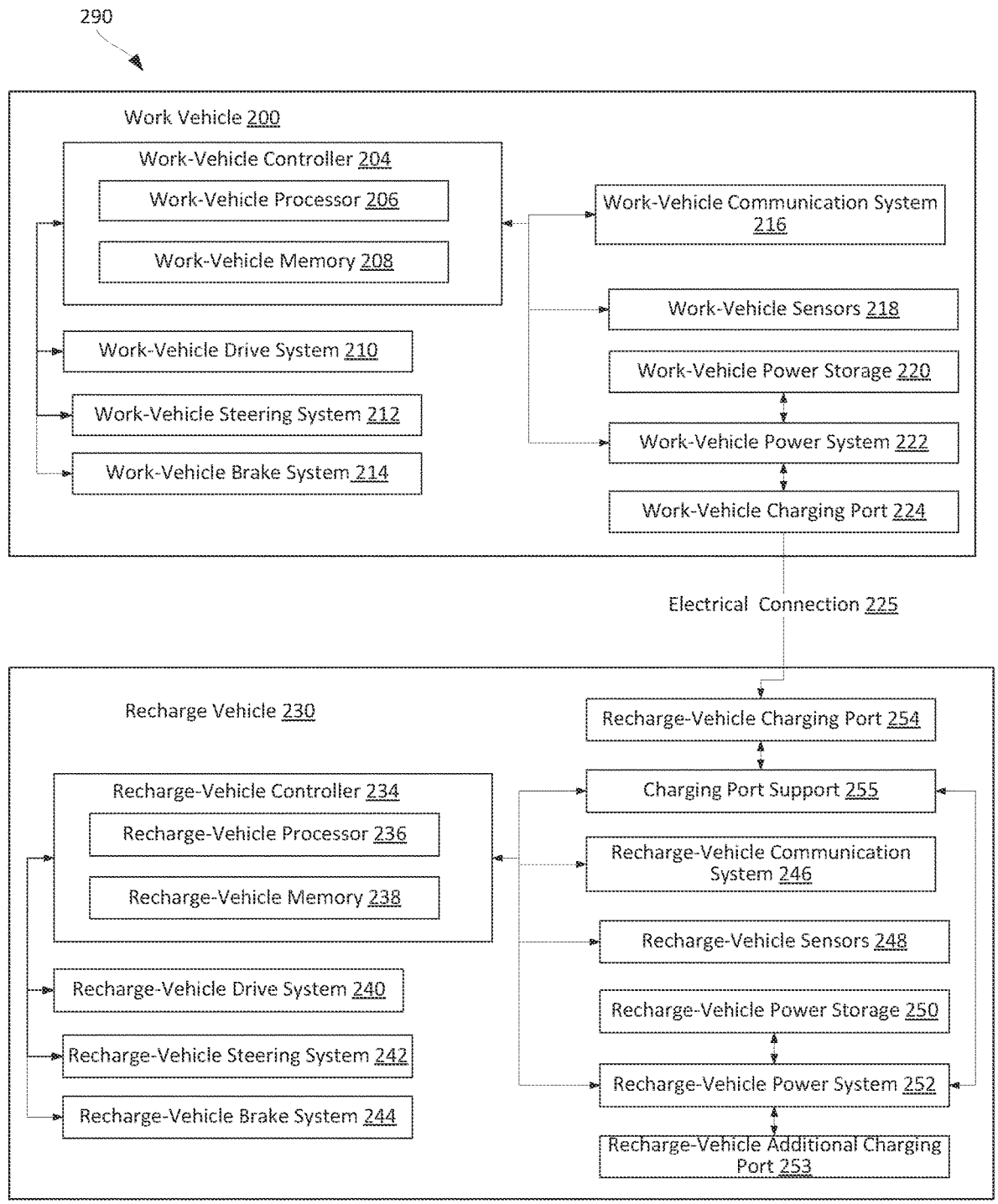
FIG. 1B is a block diagram of a vehicle charging system comprising a work vehicle and a recharge vehicle configured to form an electrical connection, in accordance with some examples.

FIG. 1B is a block diagram of vehicle charging system 290 comprising work vehicle 200 and recharge vehicle 230, in accordance with some examples. Various aspects of EV 100, which are described above with reference to FIG. 1A, are applicable to both work vehicle 200 and recharge vehicle 230. For example, work vehicle 200 comprises work-vehicle controller 204 (similar to controller 104 of EV 100), work-vehicle drive system 210 (similar to drive system 110 of EV 100), work-vehicle steering system 212 (similar to steering system 112 of EV 100), work-vehicle brake system 214 (similar to braking system 114 of EV 100), work-vehicle communication systems 216 (similar to communication system 116 of EV 100), work-vehicle sensors 218 (similar to sensors 118 of EV 100), work-vehicle power storage 220 (similar to power storage 120 of EV 100), work-vehicle power system 222 (similar to power system 122 of EV 100), and work-vehicle charging port 224. Work-vehicle charging port 224 can be similar to charging port 124 of EV 100 or different. For example, work-vehicle charging port 224 can be specially configured to form electrical connection 225 with recharge vehicle 230. In some examples, one or both work vehicle 200 and recharge vehicle 230 are equipped with a device or form electrical connection 225 (e.g., between respective charging ports) while work vehicle 200 and recharge vehicle 230 are within a predetermined distance from each other.

Likewise, recharge vehicle 230 comprises recharge-vehicle controller 234 (similar to controller 104 of EV 100), recharge-vehicle drive system 240 (similar to drive system 110 of EV 100), recharge-vehicle steering system 242 (similar to steering system 112 of EV 100), recharge-vehicle brake system 244 (similar to braking system 114 of EV 100), recharge-vehicle communication systems 246 (similar to communication system 116 of EV 100), recharge-vehicle sensors 248 (similar to sensors 118 of EV 100), recharge-vehicle power storage 250 (similar to power storage 120 of EV 100), and recharge-vehicle power system 252 (similar to power system 122 of EV 100). In some examples, recharge vehicle 230 comprises recharge-vehicle charging port 254, configured to form electrical connection 225 to work-vehicle charging port 224 as, e.g., described below with reference to FIGS. 5A-5C. For example, recharge-vehicle charging port 254 can be positioned on and supported by charging port support 255. In some examples, charging port support 255 comprises a telescoping extender (providing removable support to recharge-vehicle charging port 254) and a flexible cable (electrically coupled to recharge-vehicle charging port 254 and also to recharge-vehicle power system 252 and/or recharge-vehicle power storage 250). The telescoping extender is configured to position recharge-vehicle charging port 254 away from the general boundaries of recharge vehicle 230 and to form physical contact with work-vehicle charging port 224. Once the physical contact is formed, the telescoping extender can retract while recharge-vehicle charging port 254 remains in contact with work-vehicle charging port 224. The flexible cable provides the electrical connection to recharge-vehicle charging port 254 and allows recharge vehicle 230 to move relative to work vehicle 200 within a maximum set distance while maintaining electrical connection 225. In some examples, a charging port support is also provided on work vehicle 200. Furthermore, a charging port support can be provided on work vehicle 200 but not on recharge vehicle 230. Finally, recharge vehicle 230 can use the same (i.e., recharge-vehicle charging port 254) or a different port (e.g., recharge-vehicle additional charging port 253) to form electrical connections to charging station 283.

Work vehicle 200 and recharge vehicle 230 can be the same type of vehicles (e.g., have similar design and construction). In some examples, recharge vehicle 230 has a simplified design in comparison to work vehicle 200 since the primary operations of recharge vehicle 230 include traveling between work vehicle 220 and charging station 283 and forming electric connections with each work vehicle 220 and charging station 283. In some examples, work vehicle 202 is a tractor equipped with hydraulic actuators, power take-off (PTO) shaft, 3-point link, and other specialized features. Recharge vehicle 230 may or may not be a dedicated vehicle for recharging. In some examples, recharge vehicle 230 is a robotic rover capable of performing other specialized tasks in the field.

Work-vehicle controller 204 include work-vehicle processor 206 and work-vehicle memory 208, storing various operating instructions for work-vehicle processor 206 to execute. These operating instructions are related to various operations of work vehicle 200 (further described below). In some examples, some operating instructions can be received by work-vehicle communication system 216, e.g., from recharge vehicle 230 and/or other systems.

Likewise, recharge-vehicle controller 234 include recharge-vehicle processor 236 and recharge-vehicle memory 238, storing various operating instructions for recharge-vehicle processor 236 to execute. These operating instructions are related to various operations of recharge vehicle 230 (further described below). In some examples, some operating instructions can be received by recharge-vehicle communication system 246, e.g., from work vehicle 200 and/or other systems.

System Communication Examples

Figure 2:
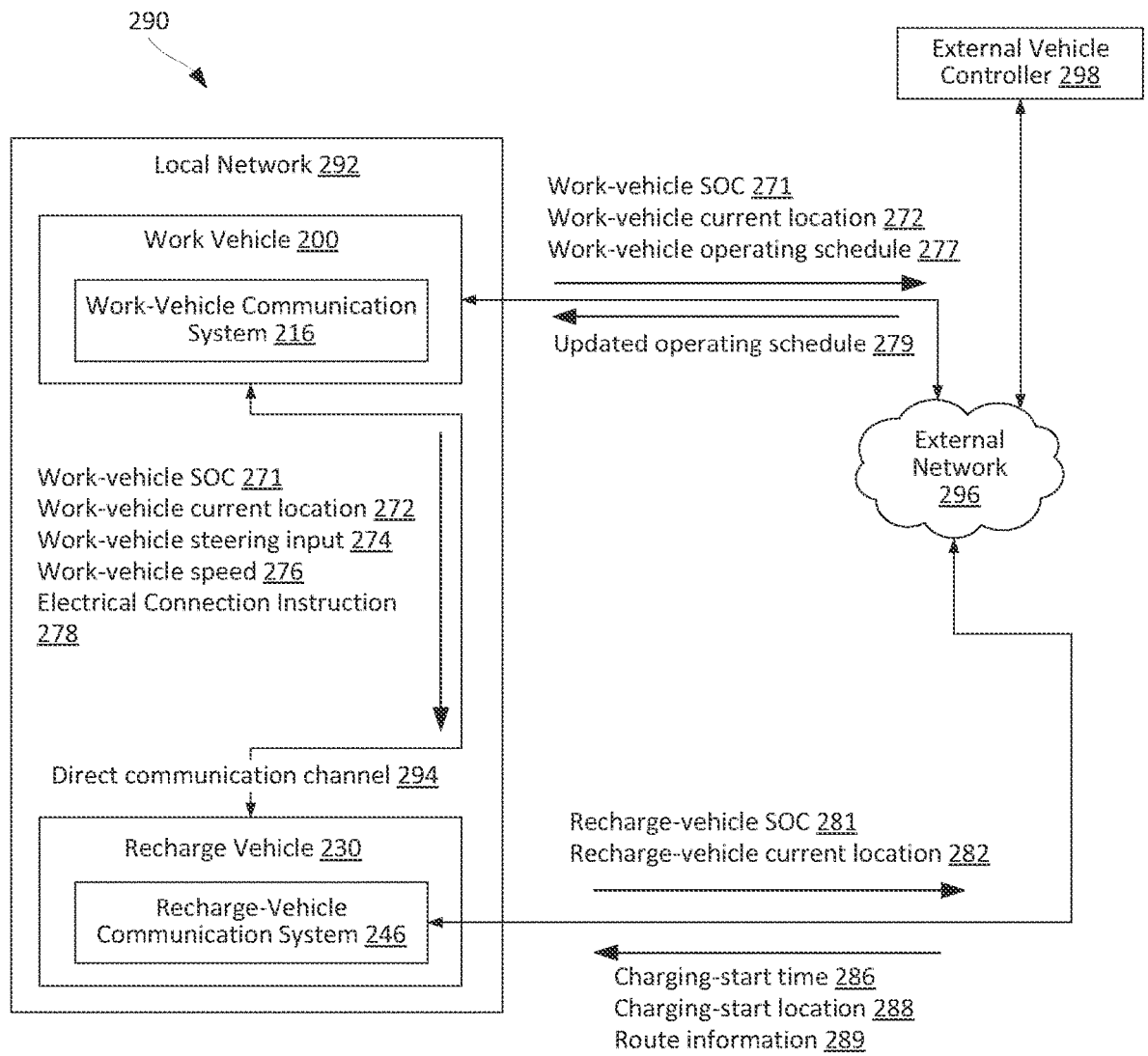
FIG. 2 is a block diagram of a vehicle charging system illustrating various communication channels within the system, in accordance with some examples.

FIG. 2 is a block diagram of vehicle charging system 290 illustrating various communication channels and data transfers within vehicle charging system 290, in accordance with some examples. As noted above, vehicle charging system 290 comprises work vehicle 200 and recharge vehicle 230. While only one instance of work vehicle 200 and one instance of recharge vehicle 230 is shown in FIG. 2, one having ordinary skill in the art would understand that vehicle charging system 290 can include any number of work vehicles (which may be referred to as a fleet of work vehicles) and any number of recharge vehicles (which may be referred to as a fleet of recharge vehicles). Multiple work and recharge vehicles provide additional functionality and flexibility in maintaining the fleet of work vehicles charged about the minimum threshold and ensure their continuous operation.

Referring to FIG. 2, in some examples, work vehicle 200 and recharge vehicle 230 form local network 292, e.g., by establishing direct communication channel 294 between work-vehicle communication system 216 and recharge-vehicle communication system 246. Various examples of communication protocols suitable for direct communication channel 294 are described above. Additional examples include a mobile network, a wireless network, a local area network, a wide area network, a Bluetooth connection, a peer-to-peer wireless connection, a Wi-Fi hotspot, or the like.

Direct communication channel 294 can be particularly useful in remote locations (e.g., farms) where long-range central communication means (e.g., cellular communications) may be limited. In some examples, direct communication channel 294 can be useful to coordinate the movement of work vehicle 200 and recharge vehicle 230, e.g., before forming electrical connection 225, while forming electrical connection 225, while maintaining electrical connection 225, and while separating electrical connection 225. Local direct communication channel 294 can be more robust have less lag in comparison to external networks. For example, work vehicle 200 can transmit work-vehicle current location 272 (e.g., GPS coordinates), work-vehicle steering input 274, work-vehicle speed 276, and/or electrical connection instructions 278. Work-vehicle current location 272 can be used by recharge vehicle 230 to establish and maintain the relative position between recharge vehicle 230 and work vehicle 200. Work-vehicle steering input 274 and/or work-vehicle speed 276 can be used for the same purpose (e.g., as further described below with reference to FIG. 6). Electrical connection instructions 278 can be used together with the relative position to form, maintain, and separate electrical connection 225 as further described with reference to FIGS. 5A-5C.

Referring to FIG. 2, in some examples, vehicle charging system 290 comprises external vehicle controller 298 forming communication channels with recharge vehicle 230 and/or work vehicle 200 through external network 296. In some examples, external vehicle controller 298 is a remote computer system (e.g., a server, cloud, distributed intelligence, and the like), which can be provided by a vehicle manufacturer and/or a vehicle operator. External network 296 and/or direct communication channel 294 can be formed via a local ad-hoc network or a local network (e.g., relaying by drones among all the vehicles involved). For example, all vehicles can continuously upload their state of charge (SOC) data to external vehicle controller 298 or other vehicles (in a distributed system). External vehicle controller 298 can select recharge vehicle 230 (e.g., the closest with a sufficient remaining SOC) to meet with work vehicle 200. In a distributed environment, other vehicles or drones can relay the request from work vehicle 200 to the closest recharging vehicle 230, which will subsequently travel to and charge work vehicle 200. In other examples, external vehicle controller 298 is a local computer system, e.g., a desktop computer, a laptop computer, a tablet computer, a mobile phone, or the like. In some examples, external vehicle controller 298 is used by an operator (e.g., a driver) of recharge vehicle 230 and/or work vehicle 200.

External network 296 can be used in addition to or instead of direct communication channel 294. Various communication protocols listed above can be used for external network 296. External vehicle controller 298 can manage a pair of recharge vehicle 230 and work vehicle 200 or a large fleet of recharge and work vehicles. In some examples, direct communication channel 294 can become a part of external network 296. For example, recharge vehicle 230 can form a communication channel with external vehicle controller 298 and use this communication channel to receive data from and/or supply data to external vehicle controller 298. Some of this data can be generated by/intended for work vehicle 200, which may not have a communication channel with external vehicle controller 298. In this example, recharge vehicle 230 can retransmit this work-vehicle data using direct communication channel 294. In other words, recharge vehicle 230 or, more specifically, recharge-vehicle communication system 246 can be used as a network node for communication between work vehicle 200 and external vehicle controller 298. In a similar manner, work vehicle 200 or, more specifically, work-vehicle communication system 216 can be used as a network node for communication between recharge vehicle 230 and external vehicle controller 298.

For example, work vehicle 200 may send work-vehicle SOC 271, work-vehicle current location 272, and work-vehicle operating schedule 277 to external vehicle controller 298. External vehicle controller 298 can use this data to determine charging-start time 286 and charging-start location 288 and relate this information to recharge vehicle 230.

If recharge vehicle 230 is autonomous, external vehicle controller 298 can also determine recharge-vehicle route 289 for recharge vehicle 230 to travel. Recharge vehicle 230 uses this information to meet/intercept work vehicle 200 in charging-start location 288 at charging-start time 286 to initiate the charge of work vehicle 200. In some examples, external vehicle controller 298 can generate updated operating schedule 279 and send this updated operating schedule 279 to work vehicle 200. For example, work vehicle 200 may be dispatched to charging-start location 288, which is more convenient to charging work vehicle 200.

In some examples, recharge vehicle 230 transmits recharge-vehicle SOC 281 and/or recharge-vehicle current location 282 to external vehicle controller 298. External vehicle controller 298 uses this data (in addition to the data from work vehicle 200) to determine charging-start time 286 and charging-start location 288. For example, vehicle charging system 290 can have multiple recharge vehicles available (e.g., at different locations and/or with different SOCs). External vehicle controller 298 can select a recharge vehicle with the most suitable location and SOC for charging a corresponding work vehicle.

Examples of Methods for Remote Charging of Work Vehicles

Figure 3:
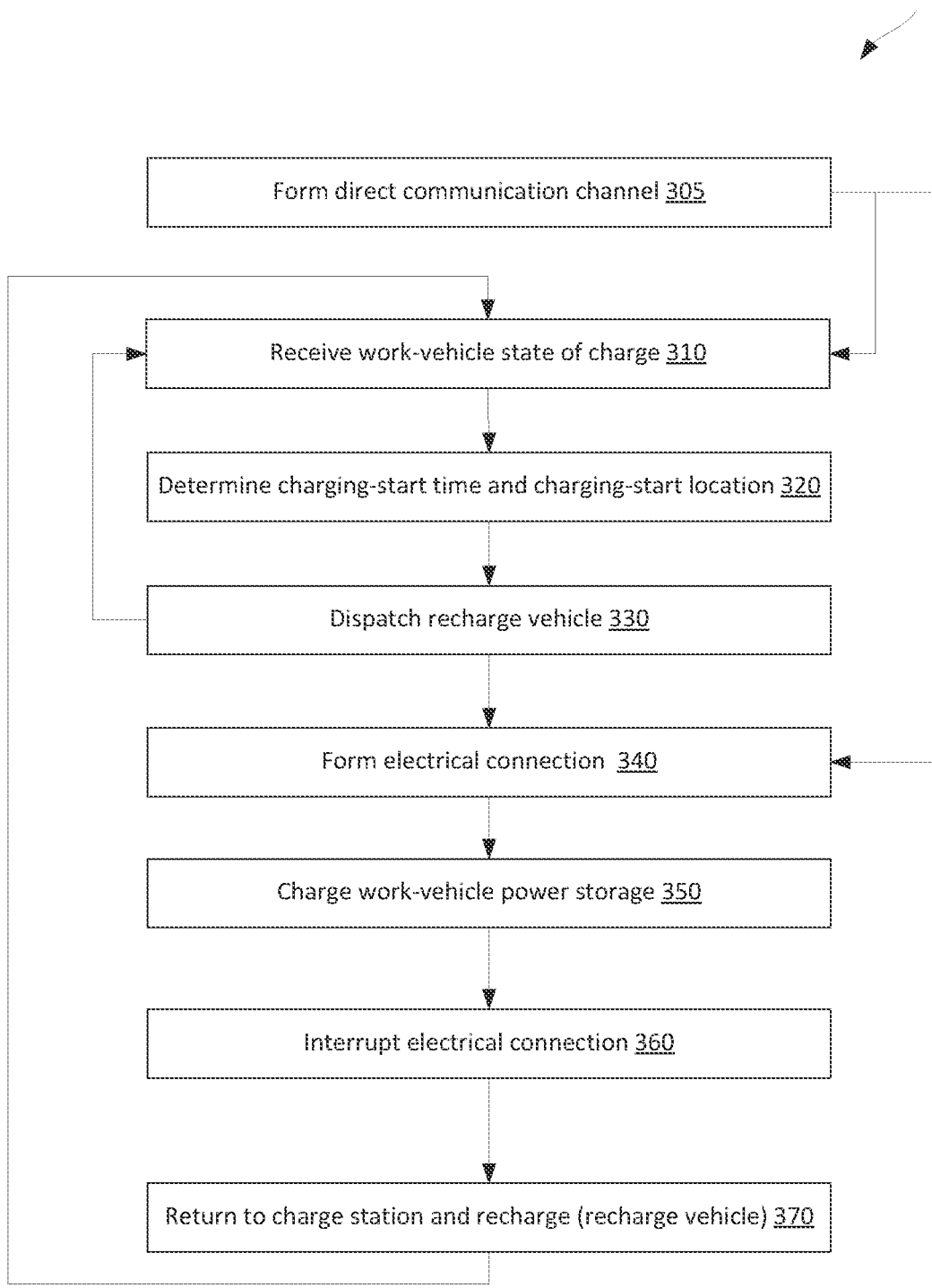
FIG. 3 is a process flowchart corresponding to a method of remote charging a work vehicle using a recharge vehicle, in accordance with some examples.

FIG. 3 is a process flowchart corresponding to method 300 of remote charging of work vehicle 200 using recharge vehicle 230. Various examples of work vehicle 200 using recharge vehicle 230 are described above. For context, work vehicle 200 comprises work-vehicle power storage 220, while recharge vehicle 230 comprises recharge-vehicle power storage 250. Recharge-vehicle power storage 250 stores electrical energy for propelling to recharge vehicle 230 to charging-start location 288, for charging work-vehicle power storage 220, and propelling recharge vehicle 230 back to a charging station. In some examples, this electrical energy is also used for propelling recharge vehicle 230 and work vehicle 200 while work-vehicle power storage 220 is being charged. In some examples, work-vehicle power storage 220 may have some remaining electrical energy before the charging starts. However, this remaining electrical energy should be generally minimized (e.g., the reduce the capacity/weight of work-vehicle power storage 220). Furthermore, in some examples, the energy in recharge-vehicle power storage 250 can be sufficient to recharge multiple work vehicles before recharge vehicle 230 needs to return to the charging station.

In some examples, method 300 comprises (block 305) forming direct communication channel 294 between work vehicle 200 and recharge vehicle 230. This direct communication channel 294 can be formed at least before forming electrical connection 225 between work vehicle 200 and recharge vehicle 230. More specifically, this direct communication channel 294 can be formed before receiving work-vehicle SOC 271 of work-vehicle power storage 220. As such, work-vehicle SOC 271 can be received at recharge vehicle 230 through direct communication channel 294. In some examples, direct communication channel 294 is used to transfer at least one of work-vehicle current location 272 of work vehicle 200, work-vehicle steering input 274 of work vehicle 200, work-vehicle speed 276 of work vehicle 200, and electrical connection instruction 278 for forming electrical connection 225 between work vehicle 200 and recharge vehicle 230. More specifically, work-vehicle current location 272 can comprise relative location 273 of work vehicle 200 to recharge vehicle 230 (rather than absolute locations of each vehicle in space). For example, relative location 273 of work vehicle 200 to recharge vehicle 230 is determined using at least one of work-vehicle sensors 218 of work vehicle 200 and recharge-vehicle sensors 248 of recharge vehicle 230. Relative location 273 can be established more precisely than absolute locations. This precision may be needed to maintain electrical connection 225 between the vehicles. In some examples, relative location 272 of work vehicle 200 to recharge vehicle 230 is continuously updated while forming electrical connection 225 and charging work-vehicle power storage 220.

In some examples, method 300 comprises (block 310) receiving work-vehicle SOC 271 of work-vehicle power storage 220. For example, work-vehicle power system 222 can be equipped with on-board diagnostic equipment to measure work-vehicle SOC 271 (e.g., Coulomb counters, voltmeters, and the like). Work-vehicle SOC 271 may be received at recharge vehicle 230 and/or external vehicle controller 298. For example, work-vehicle communication system 216 can send work-vehicle SOC 271 to one or more receiving nodes. In some examples, work-vehicle SOC 271 is received periodically and multiple historical values of work-vehicle SOC 271 can be used to predict future values of work-vehicle SOC 271 (e.g., using work-vehicle operating schedule 277 as another input). Alternatively, work-vehicle SOC 271 is not transmitted from work vehicle 200 but predicted based on work-vehicle operating schedule 277.

In some examples, method 300 comprises (block 320) determining charging-start time 286 and charging-start location 288, for charging work-vehicle power storage 220, based on at least work-vehicle SOC 271. For example, the goal is to prevent work-vehicle SOC 271 from dropping below a set minimum threshold thereby ensuring the continuous operation of work vehicle 200. In some examples, the threshold for work-vehicle SOC 271 is set at between about 5% and 30 or, more specifically, at between 10% and 25% or even between 15% and 20%. With a centralized server approach, the SOC of all vehicles can be known (as well as their locations), which may allow to operating with lower thresholds for work-vehicle SOC 271 while avoiding running out of charge completely. In some examples, the threshold can be static (e.g., a 30% threshold to give a margin of recharging before hitting a 15-20% level) or dynamic (e.g., a central server assigning these thresholds based on the availability of recharging vehicles). Also, the threshold may be adjusted dynamically to factor in the dynamic situation on the availability, locations, operations, and other factors associated with all types of vehicles at any moment.

In some examples, each recharge vehicle 230 is assigned a zone or an area in which this particular recharging vehicle 230 performs recharging operations of one or more work vehicles 200. In some examples, this zone is shared with other recharge vehicles. A charging station may or may not be available in each zone. When a charging station is not available, recharge vehicle 230 remains in its assigned zone until recharge-vehicle SOC 281 drops below its threshold. This threshold may be different from the threshold for work-vehicle SOC 271. For example, the threshold for recharge-vehicle SOC 281 can be set to ensure that recharge vehicle 230 can travel back to the recharge station.

In other examples, each recharge vehicle 230 is assigned to a group of work vehicles 230 (with one or more vehicles 230 forming a group). With multiple work vehicles 230 in a group, work vehicles 230 may stay in the same general area. In general, the assignment of recharge vehicle 230 can be intelligently decided by the overall system based on the size of the field, the number of vehicles, and other factors.

Figure 4A:
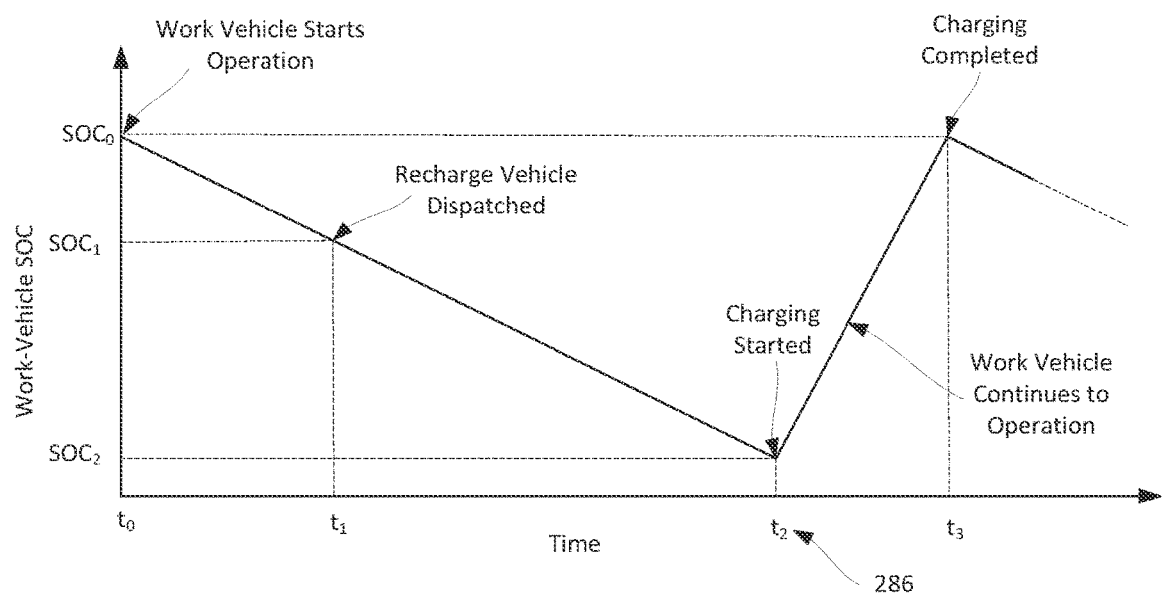
FIG. 4A is a schematic illustration of different operations performed by a work vehicle and a recharge vehicle in a vehicle charging system, in accordance with some examples.

Referring to FIG. 4A, the operation of work vehicle 200 causes work-vehicle SOC 271 to decrease (e.g., from $t_0$ to $t_2$). Furthermore, recharge vehicle 230 can take some time to reach work vehicle 200 before the charging can start. As such, to avoid interruption in the operation of work vehicle 200, recharge vehicle 230 needs to be dispatched (e.g., at $t_1$) before work-vehicle SOC 271 drops below the set minimum. In some examples, charging-start time 286 is determined at external vehicle controller 298. Alternatively, charging-start time 286 can be determined at recharge vehicle 230.

Figure 4B:
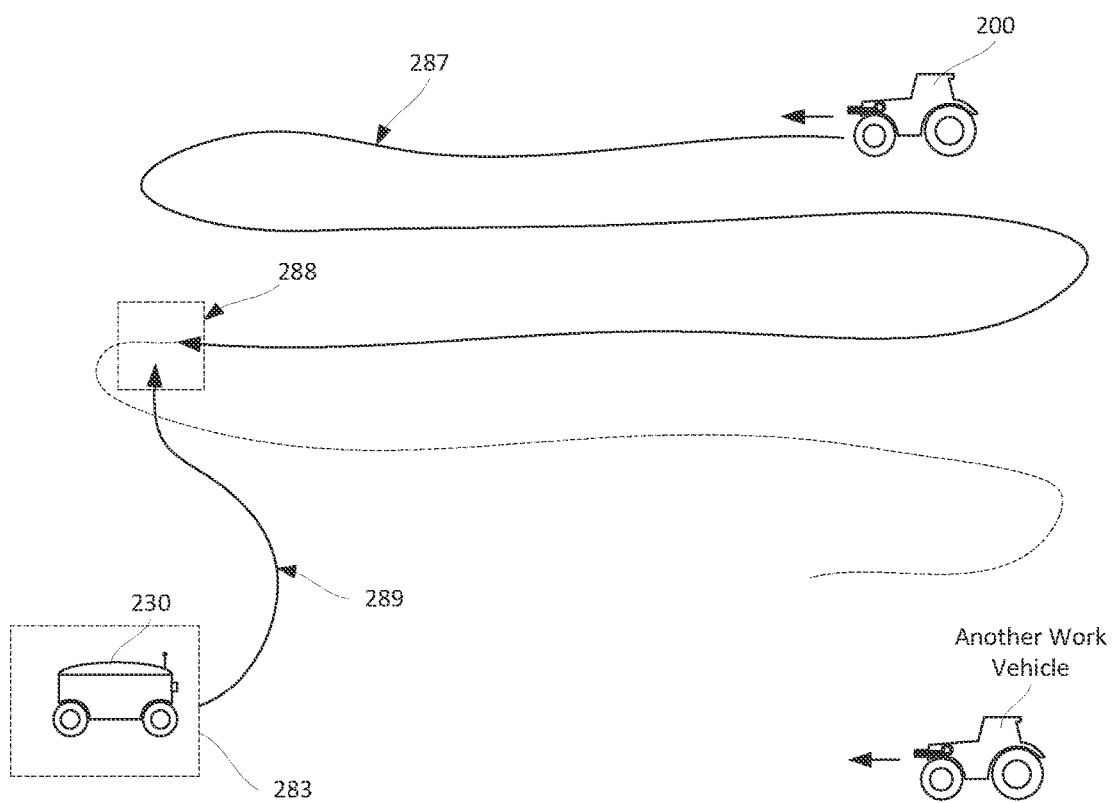
FIG. 4B is a plot of the work vehicle's SOC as a function of time, in accordance with some examples.

In some examples, charging-start location 288 and/or charging-start time 286 are determined based on work-vehicle operating schedule 277. For example, FIG. 4B illustrates work-vehicle route 287 traveled by work vehicle 200 in accordance with work-vehicle operating schedule 277 (e.g., performing some fieldwork). More specifically, work vehicle 200 can be an agricultural vehicle (e.g., a tractor) or, more specifically, an autonomous agricultural vehicle. Additional examples include unmanned ground vehicles, unmanned ariel vehicles, autonomous trucker-trailers, autonomous vehicles with robotic implements, manned electric vehicles, or the like. Work-vehicle operating schedule 277 can include various agricultural operations, such as plowing, spraying, and the like. Work-vehicle route 287 can extend through farm fields and surrounding areas. Other examples of operating environments include, but are not limited to, an industrial factory, a mine, a warehouse, a personal home, an office space, a college campus, a school campus, a garden, underwater fields, aerial surveillance, extraterrestrial space, or the like.

Charging-start location 288 can be selected on this route such that disruptions to work-vehicle operating schedule 277 are minimized or completely avoided. Furthermore, charging-start time 286 is selected based on when work vehicle 200 is expected in charging-start location 288 (e.g., while following work-vehicle operating schedule 277). In some examples, work vehicle 200 can also transmit work-vehicle current location 272 to ensure that charging-start location 288 and/or charging-start time 286 are properly selected. In a similar manner, work vehicle 200 can transmit work-vehicle operating schedule 277 to ensure that charging-start location 288 and/or charging-start time 286 are properly selected.

In some examples, work vehicle 200 is autonomous and has work-vehicle route 287 or, more generally, work-vehicle operating schedule 277 that is planned. In these examples, the power drawn by work vehicle 200 is also known or can be estimated from work-vehicle operating schedule 277 and, in some examples, from other factors (e.g., ambient temperature, route grade, and the like). Furthermore, the distances of all vehicles and their speeds can be also known or obtained. As such, charging-start location 288 and/or charging-start time 286 can be computed from these parameters, e.g., to minimize the interference with work-vehicle operating schedule 277. For example, recharging vehicle 230 can be positioned in a straight section ahead of work vehicle 202 so that the electrical connection can be formed when one vehicle moves toward another vehicle.

In some examples, charging-start location 288 and/or charging-start time 286 are determined based on recharge-vehicle current location 282 and/or recharge-vehicle SOC 281. This feature ensures that recharge vehicle 230, which will be used to charge work vehicle 200, has enough energy and is sufficiently close to work vehicle 200.

Figure 4C:
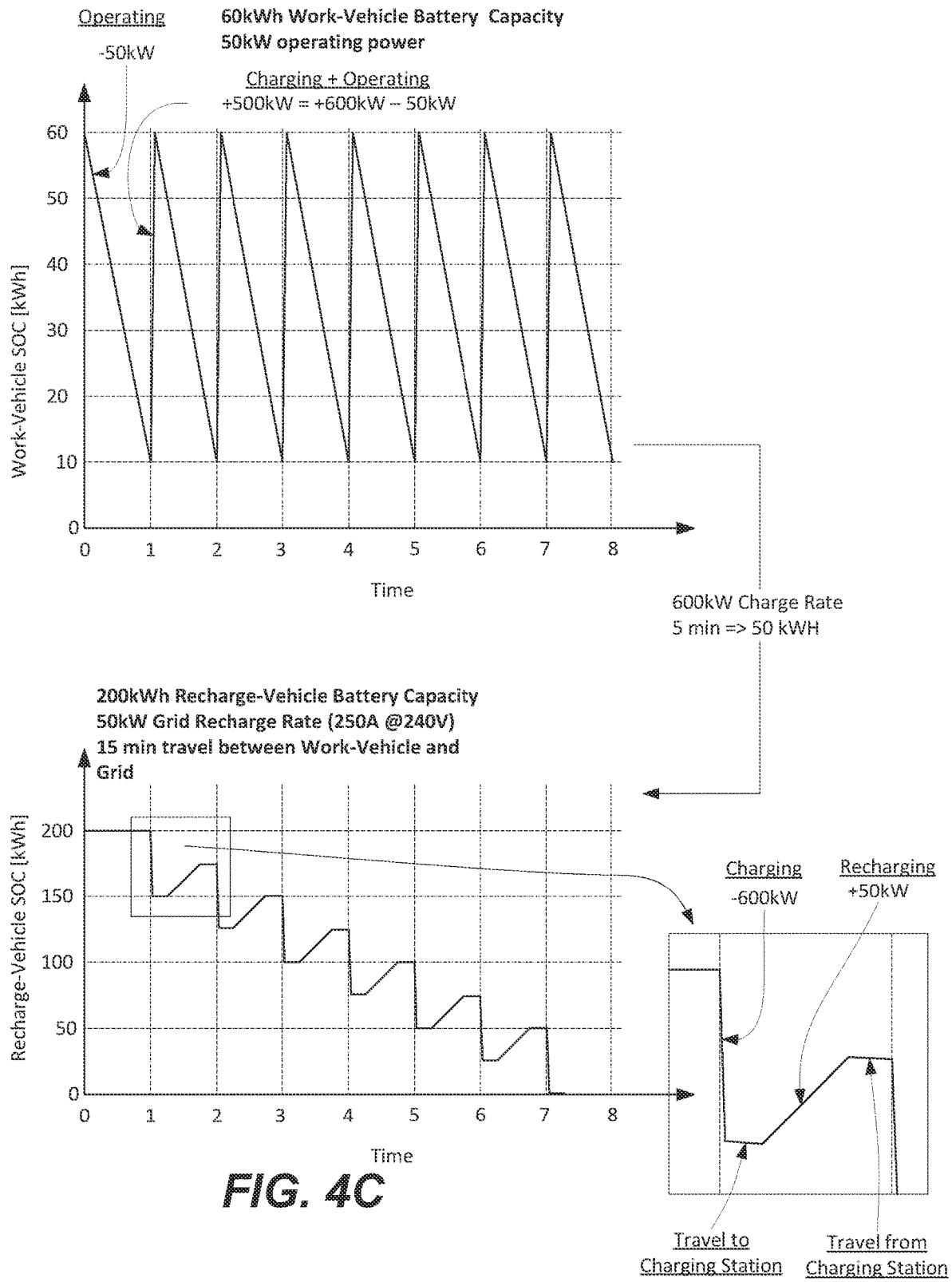
FIG. 4C is an example of coordinating the operations and state-of-charges of a work vehicle and a recharge vehicle.

FIG. 4C illustrates an example of coordinating the operations and state-of-charges of work vehicle 200 and recharge vehicle 230. In this example, work vehicle 200 has a battery capacity of 60 kWh and consumes 50 kW of power during its operation. The charge station/grid is positioned 15 min away from the worksite (assuming the driving speeds of work vehicle 200 and recharge vehicle 230) and is capable of supplying the power at 50 kW (e.g., 250A at 240V). Work vehicle 200 and recharge vehicle 230 start an 8-hour shift fully charged. Work vehicle 200 is allowed to discharge to the 10 kWh before it needs to be charged.

In a reference example, recharge vehicle 230 is not available, which means that work vehicle 100 needs to return to the charge station/grid for charging. Work vehicle 200 can complete 1 hour of operating, thereby discharging to 10 kWh, at which point work vehicle 200 needs to travel to the charge station/grid (15 minutes travel time), charge (1 hour at 50 kW), and travel to the worksite (15 minutes travel time). In other words, for each 1 hour operating at the worksite, work vehicle 200 spends 1.5 hours traveling and charging. As such, in an 8-hour shift, work vehicle 200 will operate (at the worksite) for only 3 hours.

In an actual example, where recharge vehicle 230 is available, work vehicle 200 is connected to recharge vehicle 230 right at the worksite. The charging rate (from recharge vehicle 230 to work vehicle 200) can be 600 kW. For example, recharge vehicle 230 uses NMC cells for its battery, while work vehicle 200 uses LTO cells, capable of 10C charge rates. Transferring 50 kWh of electrical energy from recharge vehicle 230 to work vehicle 200 takes only 5 minutes at this rate. Furthermore, work vehicle 200 can continue to operate during this charging time. At the end of this first charge cycle, work vehicle 200 returns to the 60 kWh capacity, while recharge vehicle 230 goes down to the 150 kWh capacity. At this point, recharge vehicle 230 travels to the charging station (15 minutes), charges at the charging station for 30 minutes (receiving 25 kWh of electrical energy), and travels from the charging station back to the worksite (15 minutes), and the cycle is repeated. While recharge vehicle 230 effectively loses 25 kWh during each cycle, its initial energy of 200 kWh is sufficient for 8 cycles or an 8-hour shift. In this example, work vehicle 200 operates continuously for the entire 8-hour shift (vs. 3 hours when recharge vehicle 230 is not available).

In some examples, (block 320) receiving work-vehicle SOC 271 and (block 330) determining charging-start time 286 and charging-start location 288 are performed at external vehicle controller 298 communicatively coupled to at least one of work vehicle 200 and recharge vehicle 230.

In some examples, method 300 comprises (block 330) dispatching recharge vehicle 230 to charging-start location 288 by charging-start time 286. For example, recharge vehicle 230 can be initially positioned at the charging station to charge recharge-vehicle power storage 250. Recharge vehicle 230 travels from its initial location to charging-start location 288. When recharge vehicle 230 is autonomous, recharge vehicle 230 can also receive recharge-vehicle route 289 (e.g., from external vehicle controller 298). It should be noted that charging-start location 288 and/or charging-start time 286 can be also selected based on recharge-vehicle current location 282, recharge-vehicle SOC 281, and other like parameters. The dispatch can come from external vehicle controller 298 or can be generated internally at recharge vehicle 230.

In some examples, method 300 comprises (block 340) forming electrical connection 225 between work vehicle 200 and recharge vehicle 230 or, more specifically, between work-vehicle charging port 224 and recharge-vehicle charging port 254. This electrical connection 225 is formed at charging-start time 282 and at charging-start location 284. One example of forming electrical connection 225 will now be described with reference to FIGS. 5A-5C.

As noted above, work vehicle 200 is equipped with work-vehicle charging port 224 (e.g., a passive socket or the like). Work-vehicle charging port 224 may include a lid, which opens up prior to forming electrical connection 225. In some examples, work-vehicle charging port 224 may be extended outside to expose a socket for an external plug to connect to. In other examples, work-vehicle charging port 224 is a wireless charge receiver, configured to receive power from an external wireless charger, e.g., to recharge the internal power storage.

Recharge vehicle 230 is equipped with recharge-vehicle charging port 254 (e.g., a plug). In some examples, recharge vehicle 230 is also equipped with charging port support 255, which may comprise a telescopic extender and a flexible cable connected to recharge-vehicle charging port 224. Alternatively, the telescopic extender and a flexible cable may be parts of work vehicle 200. Furthermore, in some examples, work-vehicle charging port 224 and recharge-vehicle charging port 254 are configured to wireless charging of work vehicle 200.

Figure 5A:
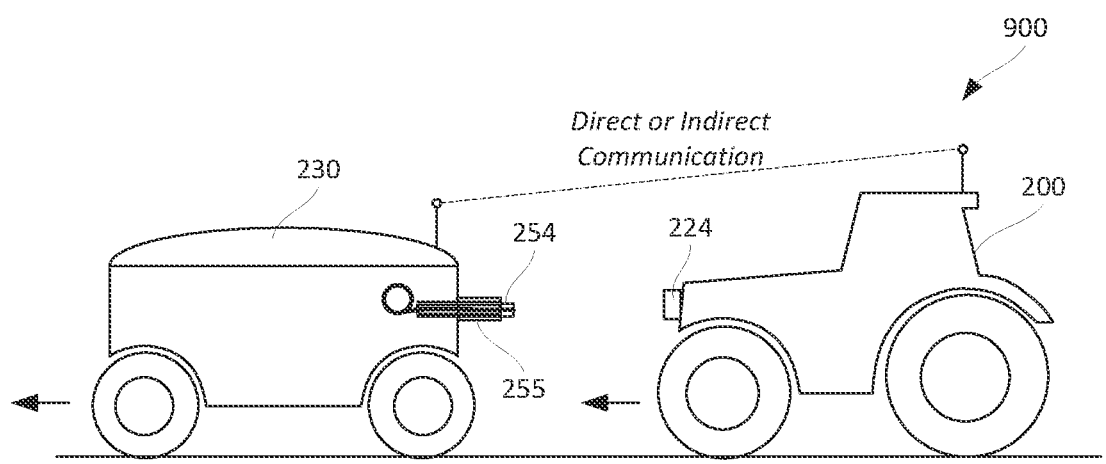
FIGS. 5A, 5B, and 5C are schematic illustrations of different stages while forming an electrical connection between a work vehicle and a recharge vehicle, in accordance with some examples.

Referring to FIG. 5A, work vehicle 200 and recharge vehicle 230 are positioned such that work-vehicle charging port 224 and recharge-vehicle charging port 254 are aligned and are within a set distance from each other. For example, recharge vehicle 230 can be positioned in front of work vehicle 200. Positioning work-vehicle charging port 224 at the front of work vehicle 200 helps to avoid interference between work-vehicle charging port 224 (and electrical connection 225 formed by work-vehicle charging port 224) and other operating components of work vehicle 200 that may be positioned on the back of work vehicle 200 (e.g., a typical position of various tractor implements). In some examples, both work vehicle 200 and recharge vehicle 230 can be moving during this alignment operation.

Figure 5B:
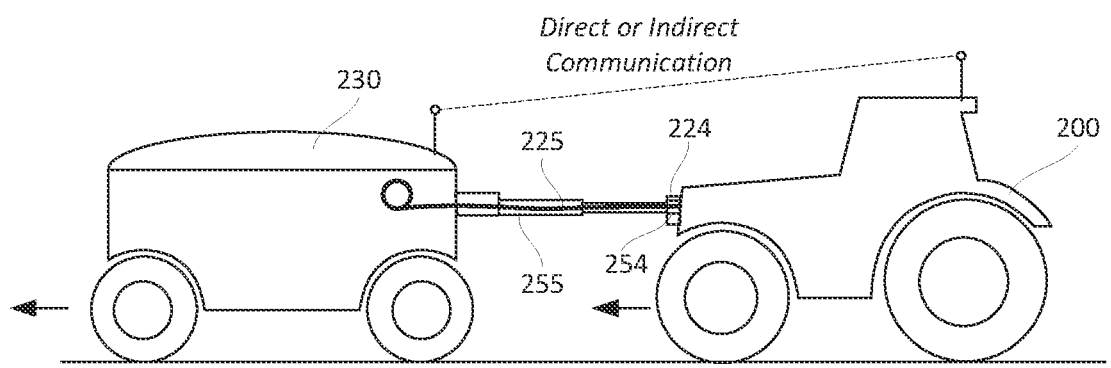

Referring to FIG. 5B, the telescopic extender of charging port support 255 can extend recharge-vehicle charging port 254 toward work-vehicle charging port 224 and form a direct physical connection (e.g., inserting a plug into a socket). At this point, electrical connection 225 between work vehicle 200 and recharge vehicle 230 is formed. In some examples, the telescopic extender can remain to protrude to work vehicle 200 during the entire charging operation, which may be referred to as a hard connection. In some examples, this hard connection allows for work vehicle 200 and recharge vehicle 230 to move relative to each other to some degree.

Figure 5C:
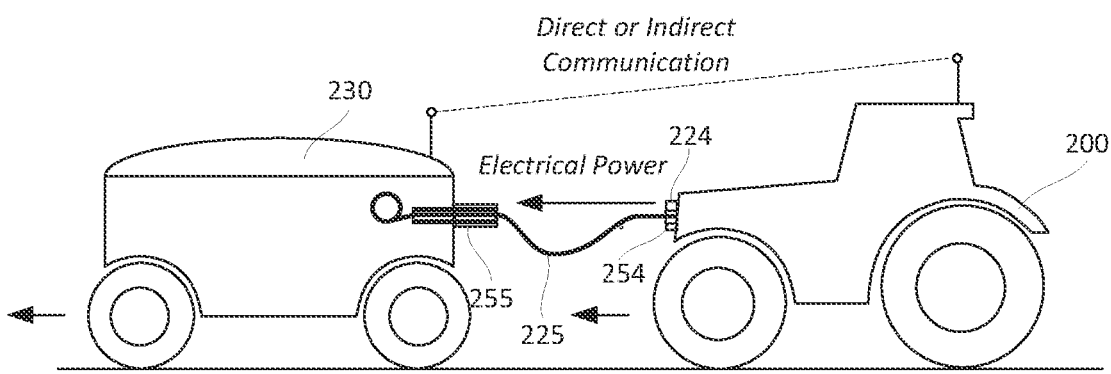

Referring to FIG. 5C, the telescopic extender can retract, leaving recharge-vehicle charging port 254 coupled to work-vehicle charging port 224. It should be noted that recharge-vehicle charging port 254 is connected to a flexible cable extending between work vehicle 200 and recharge vehicle 230 and maintaining electrical connection 225 between work vehicle 200 and recharge vehicle 230. Unlike the hard connection in FIG. 5B, the flexible cable in FIG. 5C can provide additional flexibility in relative movement between work vehicle 200 and recharge vehicle 230.

Figure 6:
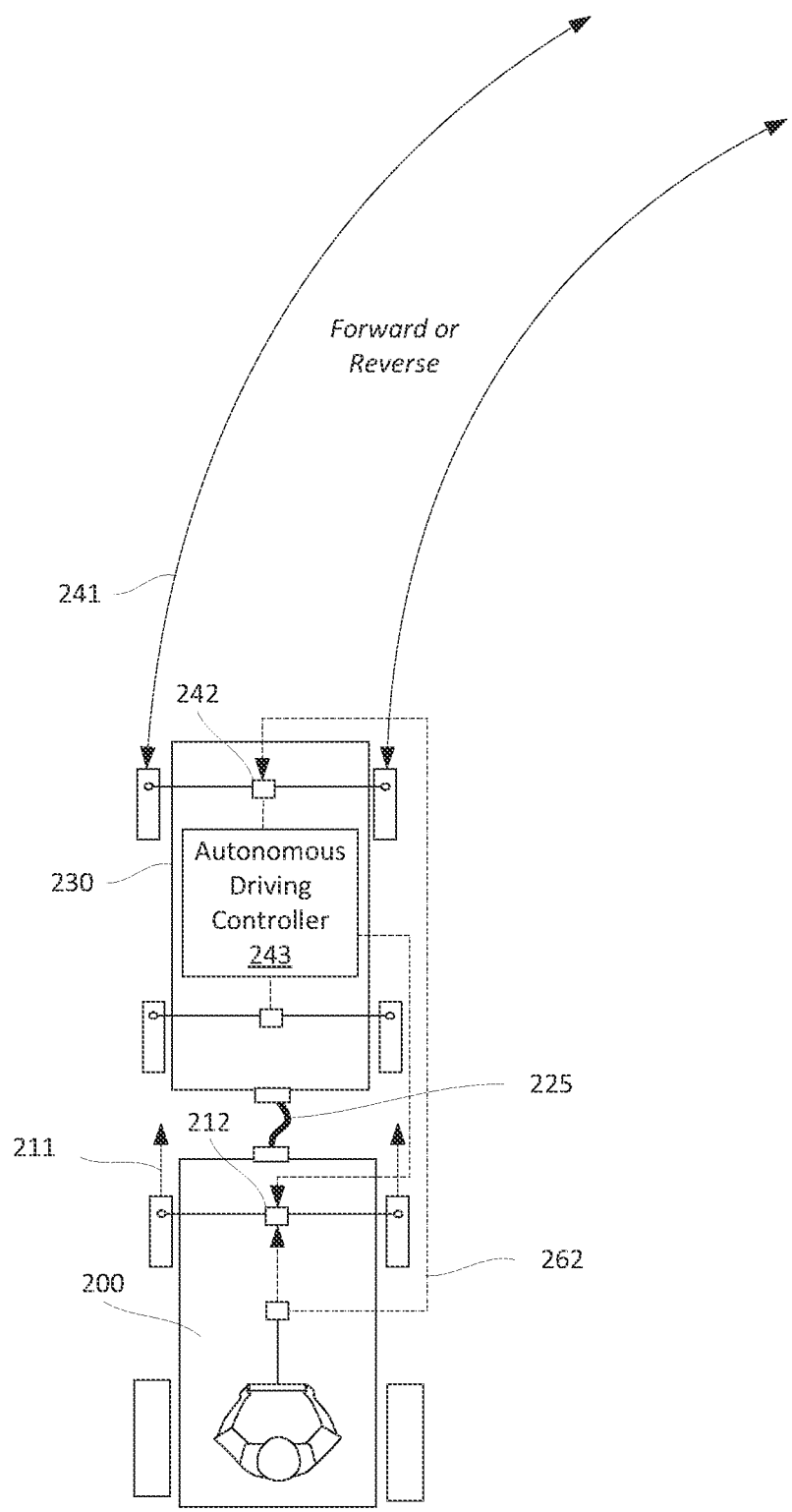
FIG. 6 is a schematic illustration of steering controls between a work vehicle and a recharge vehicle while the two vehicles are connected and travel together, in accordance with some examples.

In some examples, method 300 comprises (block 350) charging work-vehicle power storage 220 from recharge-vehicle power storage 252 through electrical connection 225. In more specific examples, work vehicle 200 and recharge vehicle 230 synchronously move while charging work-vehicle power storage 220 from recharge-vehicle power storage 252 as, e.g., is schematically shown in FIGS. 5B, 5C, and 6. The synchronous movement ensures that electrical connection 225 between work vehicle 200 and recharge vehicle 230 remains intact. More specifically, the synchronous movement maintains the distance between work-vehicle charging port 224 and recharge-vehicle charging port 254 within a set range.

In some examples, work vehicle 200 and recharge vehicle 230 synchronously move even while forming electrical connection 225 between work vehicle 200 and recharge vehicle 230 at charging-start time 286 and at charging-start location 288. Alternatively, work vehicle 200 and recharge vehicle 230 are stopped while forming electrical connection 225 (e.g., manually interconnecting work-vehicle charging port 224 and recharge-vehicle charging port 254).

Referring to FIG. 6, work-vehicle track 211 of work vehicle 200 overlaps with recharge-vehicle track 241 of recharge vehicle 230 when work vehicle 200 and recharge vehicle 230 synchronously move while charging work-vehicle power storage 220 from recharge-vehicle power storage 252. This track overlap is particularly important for farming applications, e.g., when work vehicle 200 and recharge vehicle 230 navigate through rows of plants.

FIG. 6 illustrates an example where work vehicle 200 is operated by a human, while recharge vehicle 230 is autonomous. As such, steering inputs to work-vehicle steering system 212 are provided by a driver, while steering inputs to recharge-vehicle steering system 242 are provided by autonomous driving controller 243, at least before forming electrical connection 225. In this example, after electrical connection 225 is formed between work vehicle 200 and recharge vehicle 230, control inputs provided to work vehicle 200 are also used to navigate recharge vehicle 230. These control inputs will now be described with reference to work-vehicle steering system 212 and recharge-vehicle steering system 242. However, one having ordinary skill in the art would understand that a similar approach applied to other vehicle systems, e.g., drive systems and brake systems.

Specifically, when work vehicle 200 and recharge vehicle 230 move in a forward direction with recharge vehicle 230 being in front of work vehicle 200, driver's input (e.g., to the steering wheel of work vehicle 230) is sent to recharge-vehicle steering system 242 (e.g., to steer the front wheels of recharge vehicle 230). The front wheel of work vehicle 200 are steered in response (e.g., after a set delay) to steering the front wheel of recharge vehicle 230.

Specifically, when work vehicle 200 and recharge vehicle 230 move in a reverse direction, driver's input (e.g., to the steering wheel of work vehicle 200) is sent to work-vehicle steering system 212 and recharge-vehicle steering system 242. For example, both axles of recharge vehicle 230 can be steerable. In the reverse direction, the rear axle (closest to work vehicle 200) is being steered. On the other hand, when going in the forward direction, the front axle (further away from work vehicle 200) is being steered.

In some examples, recharge vehicle 230 moves in front of work vehicle 200 while charging work-vehicle power storage 220 from recharge-vehicle power storage 252. For example, work vehicle 200 can have various attachments (e.g., a plow, a sprayer). In these examples, the overall control (of the combination of recharge vehicle 230 and work vehicle 200) can come from work vehicle 200 (e.g., with human input, autonomous input).

In some examples, work vehicle 200 is a human-controlled vehicle. Recharge vehicle 230 can be an autonomous vehicle. Recharge-vehicle steering system 242 of recharge vehicle 230 is controlled based on the driver input to work-vehicle steering system 212 of work vehicle 200 while recharge vehicle 230 moves in front of work vehicle 200 as, e.g., is schematically shown in FIG. 6.

In other examples, each work vehicle 200 and recharge vehicle 230 is an autonomous vehicle. The movement of work vehicle 200 is based on the movement of recharge vehicle 230 while recharge vehicle 230 moves in front of work vehicle 200. In these examples, recharge vehicle 230 may receive route recharge-vehicle route 289 that corresponds to work-vehicle operating schedule 277. Work vehicle 200 simply follows recharge vehicle 230 while performing operations in accordance with work-vehicle operating schedule 277. For example, the movement of work vehicle 200 corresponds to the movement of recharge vehicle 230 with a set delay determined based on speed and size of work vehicle 200 and recharge vehicle 230.

In some examples, method 300 comprises (block 360) interrupting electrical connection 225 between work vehicle 200 and recharge vehicle 230. In additional examples, the cable and the telescopic extension from recharge vehicle 230 is retracted.

Overall, receiving work-vehicle SOC 271 and determining charging-start time 286 and charging-start location 288 are repeated one or more times before forming electrical connection 225.

In some examples, method 300 comprises (block 370) recharge vehicle 230 returning to charging station 283 and recharging. It should be noted that the timing of this operation may be synchronized with the charging requirements of work vehicle 200 as, e.g., is described above with reference to FIG. 4C. Furthermore, it should be noted that recharge vehicle 230 does not need to fully charge while at charging station 283.

Example of Recharging Coordinations

Figure 7A:
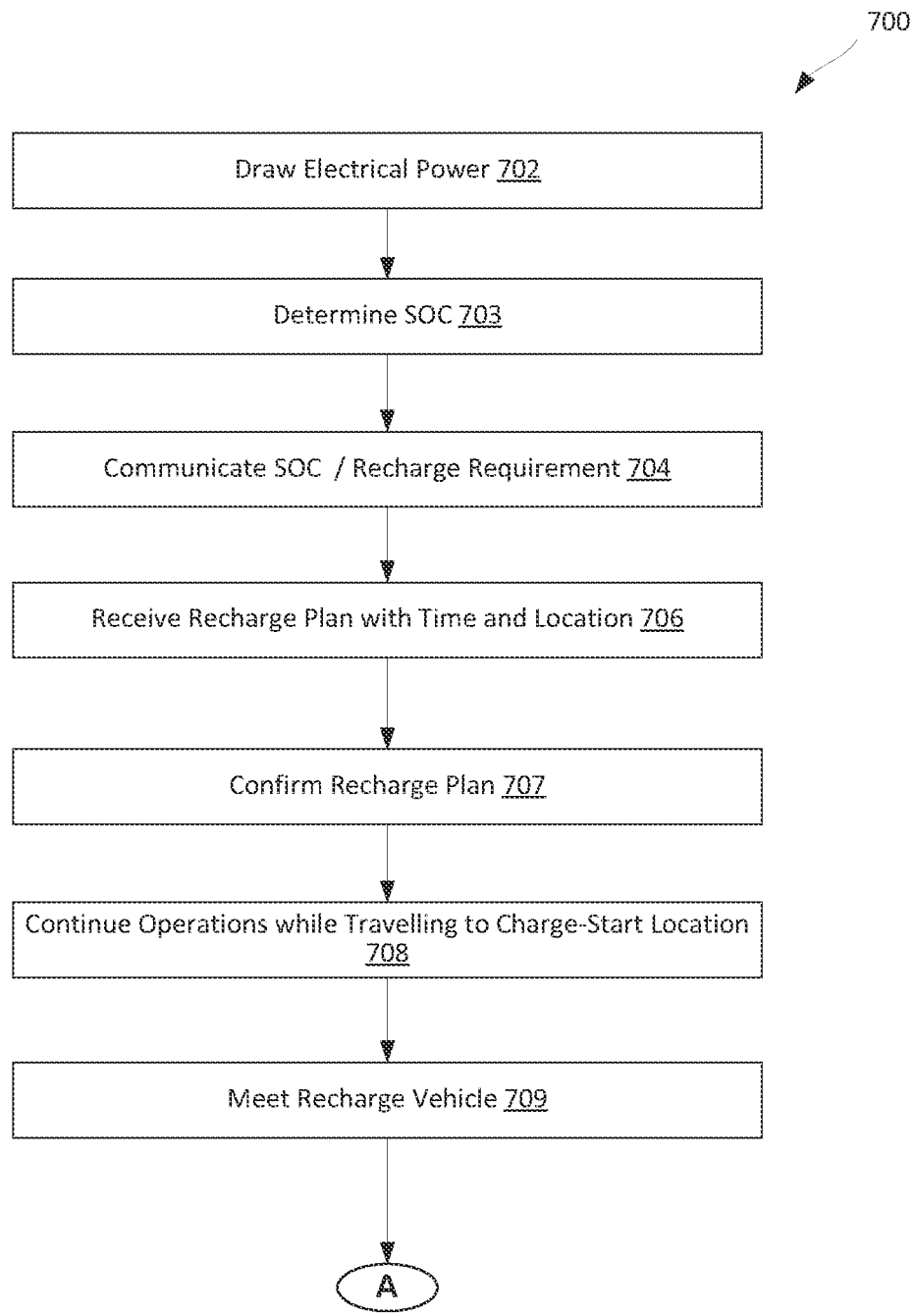
FIG. 7A is a process flowchart corresponding to a method for recharging a work vehicle, in accordance with some examples.

FIG. 7A is a process flowchart corresponding to method 700 for coordinating the recharge of work vehicle 200, in accordance with some examples. Some aspects of this method overlap with these of method 300 described above with reference to FIG. 3.

In some examples, method 700 comprises (block 702) drawing the electrical power from work-vehicle power storage 220. This electrical power may be used, e.g., to operate various components of work vehicle 200, e.g., in accordance with work-vehicle operating schedule 277. In some examples, work vehicle 200 also moves (e.g., using work-vehicle drive system 210) while performing these tasks. The power, which is drawn from work-vehicle power storage 220, reduces work-vehicle SOC 271 as, e.g., shown in FIG. 4A and explained above with reference to this figure.

In some examples, method 700 comprises (block 703) determining work-vehicle SOC 271. For example, work-vehicle power system 222 can be equipped with a Coulomb counter, voltmeters, and/or other like devices for SOC determination. Work-vehicle SOC 271 can be compared (at work vehicle 200) to one or more SOC thresholds to determine when work-vehicle power storage 220 needs to be recharged. In some examples, various types of predictive analytics can be used to determine the recharge requirement. When work vehicle 200 determines that work-vehicle SOC 271 is below a set threshold, a recharging routine can be triggered (e.g., requesting the deployment of recharge vehicle 230 to the location of work vehicle 200). In some examples, the threshold is set such that work vehicle 200 is able to continue operating while the recharging routine is being executed and before any further external power is supplied to work vehicle 200 (e.g., from recharge vehicle 230). For example, work vehicle 200 is able to complete the designated tasks, travel to the designated location, and the like, or, more generally, operate in accordance with work-vehicle operating schedule 277.

In some examples, method 700 comprises (block 704) communicating by work vehicle 200 the recharging requirement to a remote system, e.g., external vehicle controller 298 (using external network 296) and/or recharge vehicle 230 (using direct communication channel 294). Various examples of communication protocols are described above. In some examples, the recharging requirement is in the form of work-vehicle SOC 271. The recharge requirement may also include work-vehicle current location 272 and/or work-vehicle operating schedule 277. Alternatively, work vehicle 200 (e.g., work-vehicle controller 204) processes work-vehicle SOC 271 and determines charging-start time 286 and/or charging-start location 288, which are then transmitted to a remote system.

In some examples, method 700 comprises (block 706) receiving a recharge plan from a remote system, e.g., external vehicle controller 298 (using external network 296) and/or recharge vehicle 230 (using direct communication channel 294). The recharge plan can comprise charging-start time 286 and/or charging-start location 288. In some examples, the recharge plan also comprises the amount of electrical energy to be transferred from recharge vehicle 230 to work vehicle 200 (e.g., 50 kWh, 75 kWh). For example, recharge vehicle 230 can store electrical energy sufficient for charging multiple work vehicles. Furthermore, the recharge-vehicle energy can be allocated based on the needs of work vehicle 200 (e.g., determined from work-vehicle operating schedule 277). In some examples, the recharge plan can also comprise electrical connection instructions 278. Various examples of determining these elements of the recharge plan are described above with reference to FIG. 3.

In some examples, method 700 comprises (block 707) confirming the receipt of the recharge plan to the remote system. This confirmation indicated that work vehicle 200 can follow the recharge plan, e.g., to meet recharge vehicle 230 in charging-start location 288 at charging-start time 286. In some examples, the deployment (at least to the final charging-start location 288) is delayed until the receipt of the recharge plan is confirmed. The confirmation, which may be also referred to as acknowledgment, is important since network connectivity can be unstable in some applications (e.g., remote farms). The confirmation in this operation (and subsequent operations described below) ensures that a vehicle received all instructions and the system (as a whole) can continue to operate.

In some examples, method 700 comprises (block 708) continuing various operations (e.g., in accordance with work-vehicle operating schedule 277) while waiting for the recharge plan to be executed. Furthermore, as a part of these operations, work vehicle 200 travels to charging-start location 288 where work vehicle 200 meets with recharge vehicle 230 at charging-start time 286. It should be noted that charging-start time 286 and charging-start location 288 are selected (e.g., based on work-vehicle SOC 271 and other parameters) such that work vehicle 200 has sufficient electrical energy to move to charging-start location 288. Furthermore, charging-start time 286 and charging-start location 288 can be selected to minimize the impact on the primary operations of work vehicle 200 (e.g., set by work-vehicle operating schedule 277). For example, charging-start location 288 can be selected along work-vehicle route 287.

In some examples, method 700 comprises (block 709) meeting recharge vehicle 230 in charging-start location 288 at charging-start time 286, e.g., as specified in the recharge plan. In some examples, work vehicle 200 or recharge vehicle 230 can arrive at the planned location before the other vehicle, in which case the first-arriving vehicle waits for the second-arriving vehicle. Alternatively, both work vehicle 200 and recharge vehicle 230 arrive at the planned location at the same time (e.g., to reduce idle time).

In some examples, the program instructions stored in work-vehicle memory 208 enable the operations described above with reference in FIG. 7A. These program instructions are executed by work-vehicle processor 206, which sends processed instructions to other components of work vehicle 200 such as work-vehicle drive system 210, work-vehicle steering system 212, and work-vehicle braking system 214.

Figure 7B:
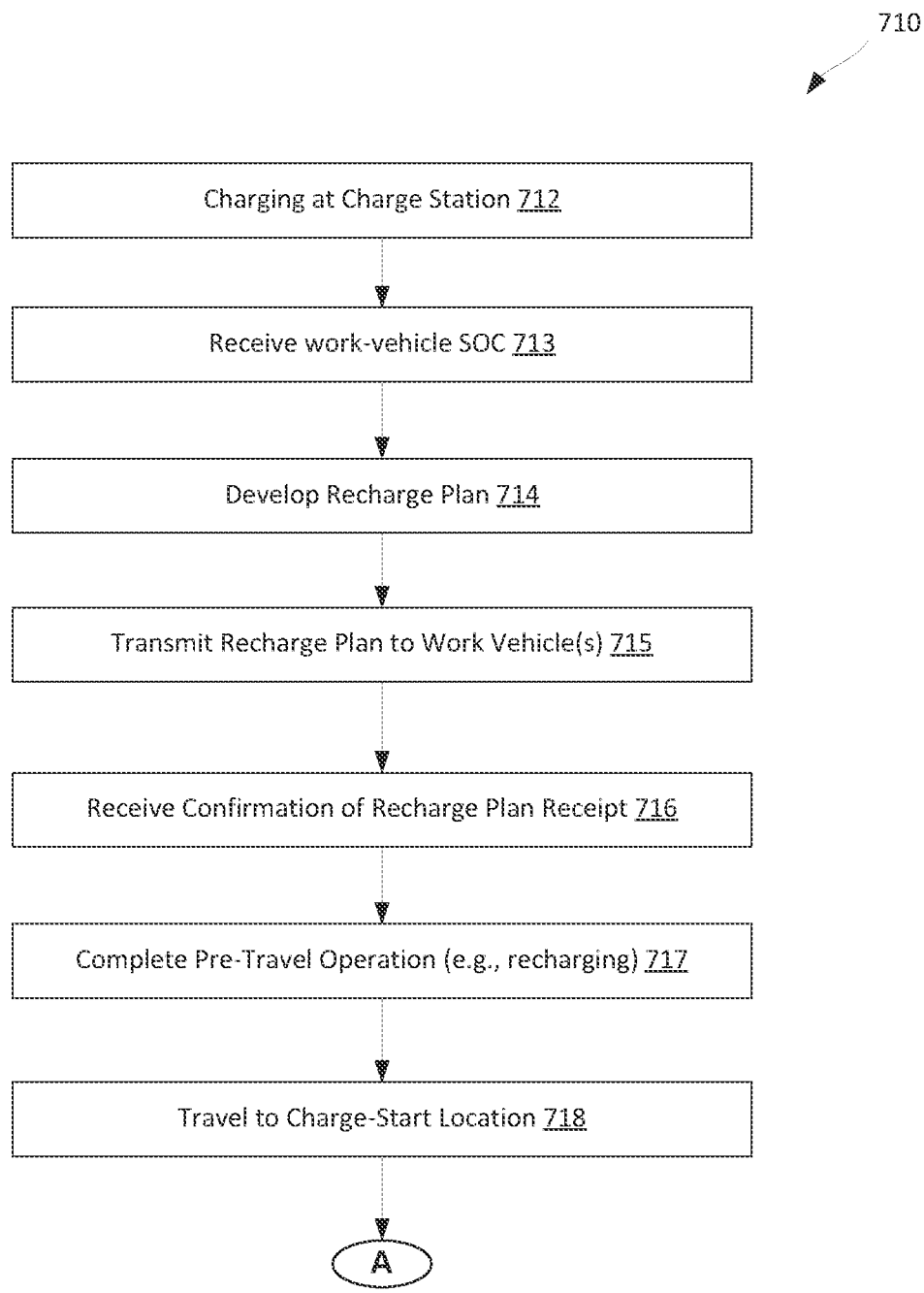
FIG. 7B is a process flowchart corresponding to a method for operating a recharge vehicle while recharging the work vehicle, in accordance with some examples.

FIG. 7B is a process flowchart corresponding to method 710 of moving recharge vehicle 230 to charging-start location 288, in accordance with some examples. It should be noted that method 710 can be coordinated with method 700 to ensure that work vehicle 200 meets recharge vehicle 230 in charging-start location 288 at charging-start time 286.

In some examples, method 710 comprises (block 712) charging recharge vehicle 230 at charging station 283 or from another recharge vehicle. Alternatively, recharge vehicle 230 may remain idle and/or charge other vehicles (e.g., work vehicle or other recharge vehicles).

In some examples, method 710 comprises (block 713) receiving work-vehicle SOC 271 and/or other parameters associated with work vehicle 200 (e.g., work-vehicle current location 272). This information may be received directly from work vehicle 200 (e.g, using direct communication channel 294) and/or from external vehicle controller 298 (e.g., using external network 296). In some examples, recharge vehicle 230 may periodically poll work-vehicle SOC 271 and decide the recharge requirement at recharge vehicle 230. In some examples, work vehicle 200 may push work-vehicle SOC 271, e.g., when work-vehicle SOC 271 is at or below a set threshold. This threshold can be established based on the power requirement of work vehicle 200 and the expected deployment time of recharge vehicle 230.

In some examples, method 710 comprises (block 714) developing a recharge plan or, more specifically, determining charging-start time 286 and charging-start location 288 for charging work vehicle 200. Various aspects of this operation are described above with reference to FIG. 3. This recharge plan can be developed at recharge vehicle 230 and/or at external vehicle controller 298. In some examples, multiple recharge vehicles 230 communicate and coordinate among their respective recharge plans. For example, a fleet of recharge vehicles 230 used for charging a fleet of work vehicles 200. In this example, work-vehicle SOCs 271 of work vehicles 200 (and other parameters, e.g., recharge-vehicle SOCs 281, recharge-vehicle current locations 282) can be analyzed collectively.

In some examples, method 710 comprises (block 715) transmitting the recharge plan to one or more work vehicles 200. When the recharge plan is developed by external vehicle controller 298, the recharge plan is also transmitted to one or more recharge vehicles 230. The recharging plan comprises charging-start time 286 and charging-start location 288 for charging at least one of work vehicles 200.

In some examples, method 710 comprises (block 716) receiving a confirmation that the recharge plan was received by work vehicle 200. This confirmation is received at recharge vehicle 230, e.g., either through direct communication channel 294 with work vehicle 200 or through external network 296. External vehicle controller 298 can also receive a similar confirmation. In some examples, multiple work vehicle 200 are scheduled for recharging sequentially from the same recharge vehicle 230. In these examples, the confirmation that is received by recharge vehicle 230 includes a list of work vehicles 2020, the recharge sequence, and the likes.

In some examples, method 710 comprises (block 717) completing various pre-travel operations at recharge vehicle 230 before recharge vehicle 230 is dispatched to charging-start location 288. For example, recharge vehicle 230 can be charged at charging station 283, e.g., to achieve recharge-vehicle SOC 281 needed for subsequent travel and charging of one or more work vehicles 200.

In some examples, method 710 comprises (block 718) traveling to charging-start location 288. Recharge vehicle 230 (e.g., that is autonomous) can receive recharge-vehicle route 289. In some examples, recharge vehicle 230 arrives at charging-start location 288 before or at the same time with work vehicle 200, e.g., to avoid any delays at work vehicle 200.

Examples of Engaging the Charging Port Using the Connector

Figure 7C:
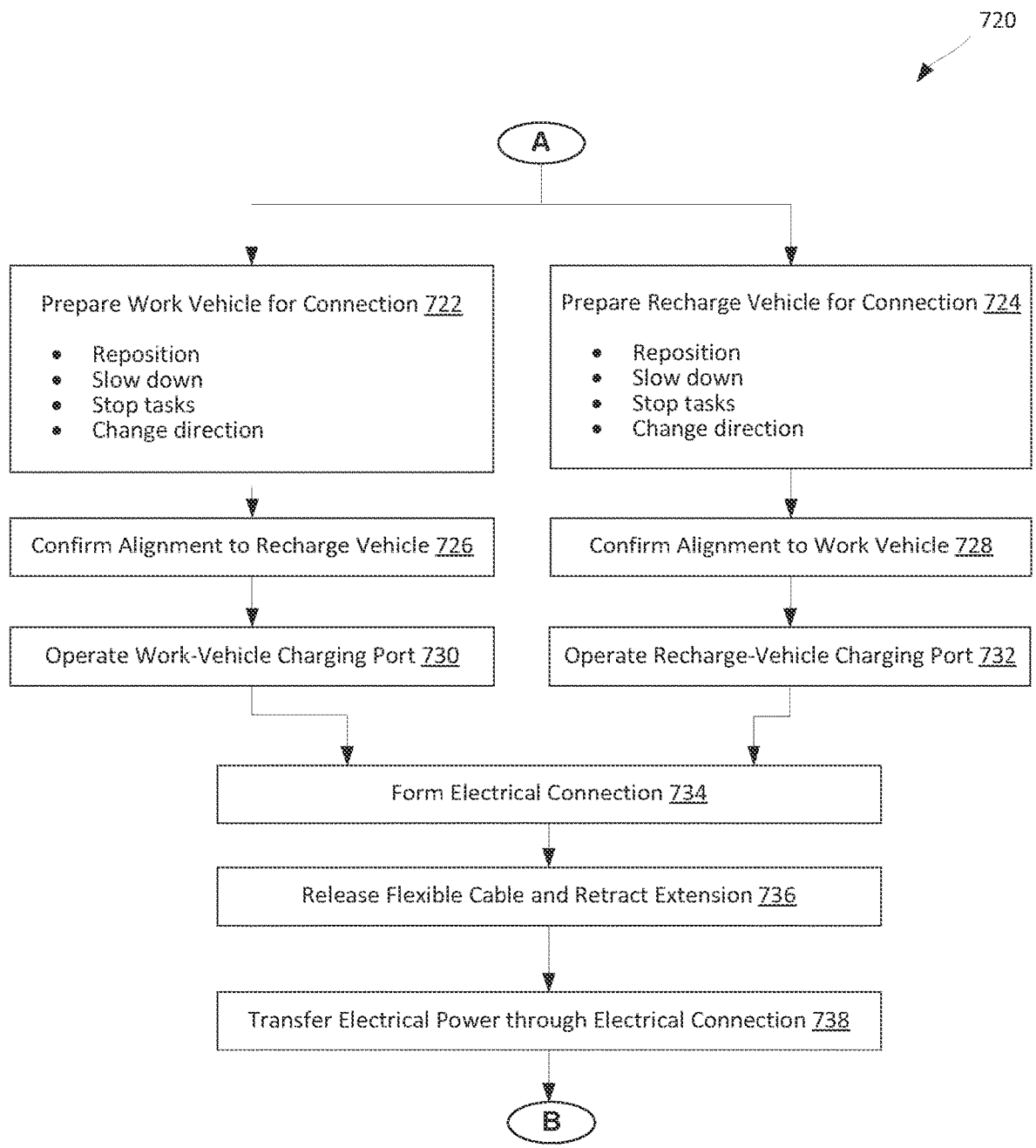
FIG. 7C is a process flowchart corresponding to a method for charging an autonomous electric vehicle using the charging port of this vehicle, in accordance with some examples.

FIG. 7C is a process flowchart corresponding to method 720 for forming electrical connection 225 between work vehicle 200 and recharge vehicle 230. Some aspects of this method are described above with reference to FIG. 3 and FIGS. 5A-5C. This method involves the interconnection of work-vehicle charging port 224 with recharge-vehicle charging portion 254. This interconnection can be performed while both work vehicle 200 and recharge vehicle 230 are stationary. Alternatively, this interconnection can be performed while work vehicle 200 and recharge vehicle 230 are moving (e.g., while work vehicle 200 continues to perform various operations). It should be noted that this process is performed while work vehicle 200 and recharge vehicle 230 are in charging-start location 288. The process is initiated at charging-start time 286.

In some examples, method 720 comprises (block 722) preparing work vehicle 200 for the connection. For example, work vehicle 200 communicated with recharge vehicle 230 (e.g., either through direct communication channel 294 with work vehicle 200 or through external network 296. For example, work vehicle 200 can transmit work-vehicle current location 272, work-vehicle steering input 274, work-vehicle speed 276, and/or electrical connection instruction 278. Recharge vehicle 230 can use this information for positioning recharge vehicle 230 (relative to work vehicle 200) in a way that allows forming an electrical connection. In some examples, work vehicle 200 and recharge vehicle 230 confirm with each other the availability and sighting of the other. Various sensors can be used for this purpose. Overall, work vehicle 200 can reposition itself, slow down (e.g., stop), stop performing tasks, and/or change the direction as a part of this connection preparation operation.

In some examples, method 720 comprises (block 724) preparing recharge vehicle 230 for the connection. Various aspects of this connection preparation operation can be the same as for work vehicle 200, e.g., repositioning, slowing down, stopping primary operational tasks, changing direction, or the like. In some examples, the vehicle controllers of both vehicles (or at least one vehicle) may use sensors to assess the environment and position of the two vehicles suitable for electrical connection 225. It should be noted that the relative position (suitable for electrical connection 225) can be a moving position, e.g., when both vehicles are moving while maintaining the relative position. In some examples, the vehicle controller of one or both vehicles may use the communication systems to coordinate various operations between the two vehicles, in particular moving operations. Some aspects of this are described above with reference to FIGS. 5A-5C.

In some examples, method 720 comprises (block 726) conforming the alignment of work vehicle 200 to recharge vehicle 230. This alignment confirmation is transmitted from work vehicle 200 to recharge vehicle 230. Similarly, in some examples, method 720 comprises (block 728) conforming the alignment of recharge vehicle 230 to work vehicle 200. This alignment confirmation is transmitted from recharge vehicle 230 to work vehicle 200.

In some examples, method 720 comprises (block 730) operating work-vehicle charging port 224. Similarly, in some examples, method 720 comprises (block 732) operating recharge-vehicle charging port 254. In some examples, only one of these operations is performed, e.g., operating recharge-vehicle charging port 254, while work-vehicle charging port 224 remains stationary. For example, work-vehicle charging port 224 can be a passive socket configured to receive a plug of recharge-vehicle charging port 254 that can be actuated using charging port support 255. In these examples, charging port support 255 may include a telescopic extender, a charging plug, and a flexible cable connected to the charging plug. The telescopic extender can extend outside the general boundary of recharge vehicle 230 and support recharge-vehicle charging port 254 for direct connection to work-vehicle charging port 224.

Alternatively, both recharge-vehicle charging port 254 and work-vehicle charging port 224 are actively operated. In additional examples, recharge-vehicle charging port 254 remains stationary, while work-vehicle charging port 224 is operated to form electrical connection 225. In some examples, work-vehicle charging port 224 may open a lid to receive an external plug into the internal socket or the like. In some embodiments, work-vehicle charging port 224 may be extended outside to expose a portion of work-vehicle charging port 224, configured to connect with recharge-vehicle charging port 254.

In some examples, method 720 comprises (block 736) releasing a flexible cable (to enable flexible coupling between the two vehicles) and retracting charging port support 255 (to remove the rigid coupling). The flexible coupling allows the two vehicles to move relative to each other with a certain range provided by the flexible cable thereby reducing the need for very restrictive alignment of the vehicles. Furthermore, the flexible coupling allows the two vehicles to navigate an uneven terrain (e.g., tilt relative to each other). Alternatively, this operation is not performed (e.g., both vehicle remains stationary while transferring electrical power). Furthermore, the flexible coupling can be provided by other means (e.g., without flexible cables)

In some examples, method 720 comprises (block 738) transferring electrical power through electrical connection 225 from recharge vehicle 230 to work vehicle 200. In some examples, both vehicles move, at least during a portion of this power transfer operation. For example, work vehicle 200 may continue performing its operations while being charged. In some examples, a fast-charging system may be used to transfer the power at a high rate such as between 200 kW and 1,500 kW or, more specifically, between 500 kW and 1,000 kW. In some examples, the charge rate can be presented as a C-rate (with "C" being the battery capacity of work vehicle 200) and be at least 5C, or at least 10C or, more specifically, between 5C and 10C.

Alternatively, work vehicle 200 is equipped with a wireless charger receiver, while recharge vehicle 230 is equipped with a wireless charger.

Examples of Vehicle Operations while Charging

Figure 7D:
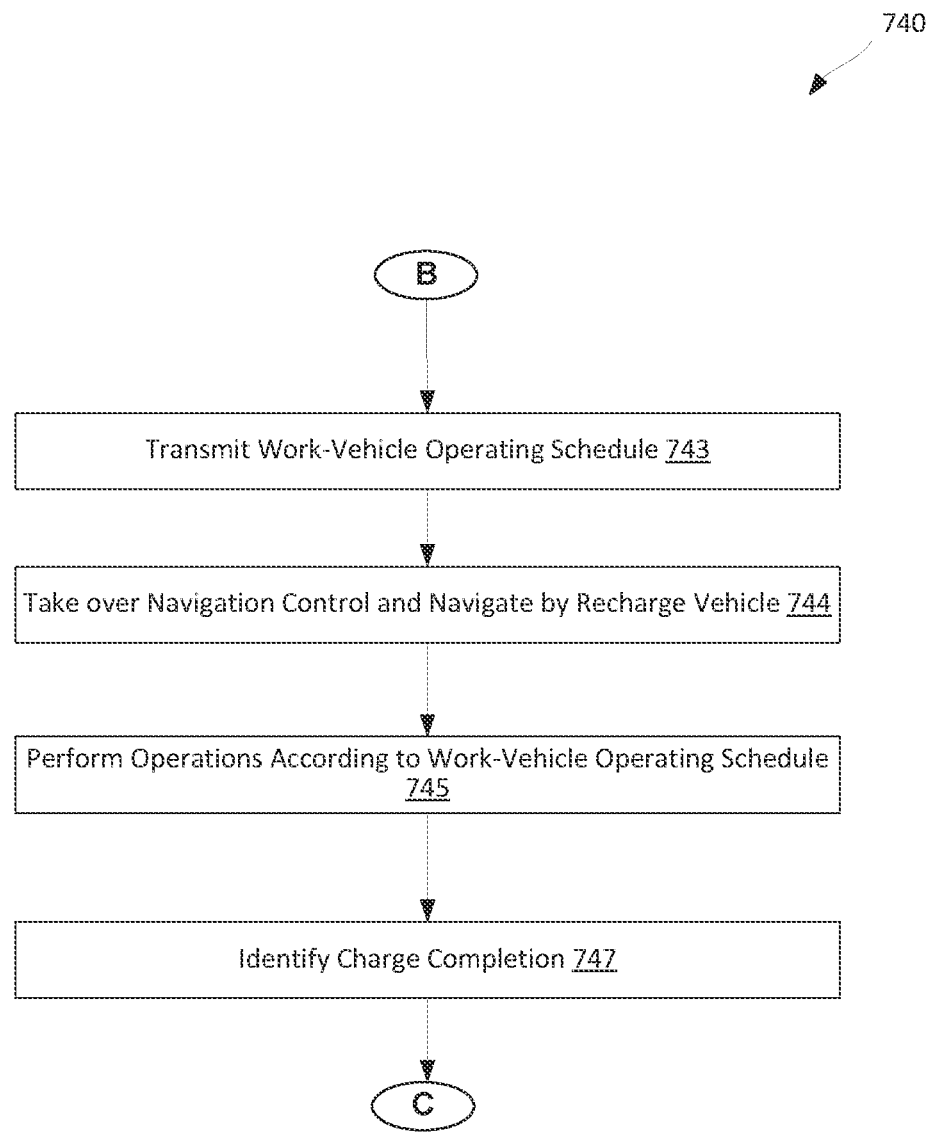
FIG. 7D is a process flowchart corresponding to a method for operating an autonomous electric vehicle, while simultaneously charging the vehicle, in accordance with some examples.

FIG. 7D is a process flowchart corresponding to method 740 of operating work vehicle 200 and, in some examples, recharge vehicle 230 while charging work vehicle 200 from recharge vehicle 230. In other words, electrical connection 225 is maintained between work vehicle 200 and recharge vehicle 230 during this entire process.

In some examples, method 740 comprises (block 743) transmitting work-vehicle operating schedule 277 to recharge vehicle 230. Alternatively, recharge vehicle 230 already has work-vehicle operating schedule 277 (e.g., before being dispatched to charging-start location 288). Recharge vehicle 230 can use work-vehicle operating schedule 277 for further navigation of both vehicles while work vehicle 200 is being charged.

In some examples, method 740 comprises (block 744) taking over the navigation control of both vehicles by recharge vehicle 230. In these examples, recharge vehicle 230 can generate updated operating schedule 279, e.g., based on the current navigation. Updated operating schedule 279 is transmitted to work vehicle 200. Alternatively, work vehicle 200 takes over the navigation control of both vehicles.

In some examples, method 740 comprises (block 745) performing operations according to work-vehicle operating schedule 277 by work vehicle 200. In more specific examples, these operations may involve moving, turning, and/or generally repositioning work vehicle 200. Work vehicle 200 and recharge vehicle 230 continue to coordinate their movements and take various actions to ensure that electrical connection 225 is preserved. In some examples, these actions may involve deviations from work-vehicle operating schedule 277. For example, work vehicle 200 and/or recharge vehicle 230 may adapt their movement.

In some examples, method 740 comprises (block 747) identifying the charge completion, e.g., when work-vehicle SOC 271 and/or recharge-vehicle SOC 281 reach a set threshold. This threshold (for work-vehicle SOC 271) may be set such that work vehicle 200 is able to continue completing operations per work-vehicle operating schedule 277 until the next charging is performed. The threshold (for recharge-vehicle SOC 281) may be set such that recharge vehicle 230 can return to charging station 283. In some examples, the charging completion is identified by recharge-vehicle power system 252. In further examples, the task completion information is exchanged between work vehicle 200 and recharge vehicle 230.

In some examples, work vehicle 200 is equipped with a wireless charger receiver, while recharge vehicle 230 is equipped with a wireless charger. Various steps in method 740 are adapted to enable the continuous power supply from the wireless charger of recharge vehicle 230 to the wireless charger receiver of work vehicle 200.

Examples of Connection Disengagement

Figure 7E:
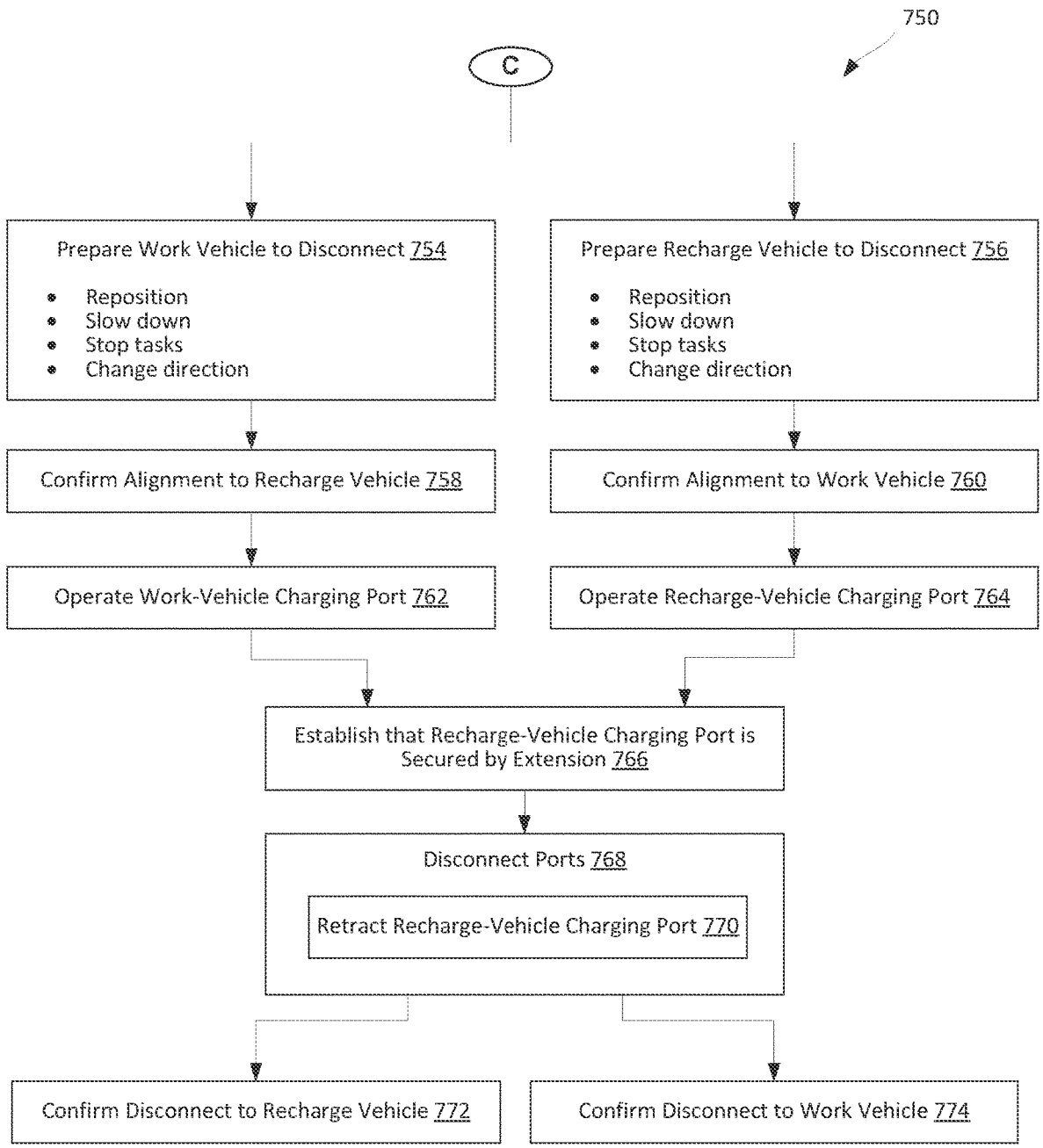
FIG. 7E is a process flowchart corresponding to a method for disengaging the charging port of the autonomous electric vehicle, in accordance with some examples.

FIG. 7E illustrates a process flowchart corresponding to method 750 for disengagement of electrical connection 225 between work vehicle 200 and recharge vehicle 230, in accordance with some examples. Method 750 may be triggered by the charge completion, e.g., when work-vehicle SOC 271 and/or recharge-vehicle SOC 281 reach a set threshold, as described above.

In some examples, method 750 comprises (block 754) preparing work vehicle 200 to disconnect from recharge vehicle 230. For example, this operation may involve repositioning, slowing down, stopping primary operations, and/or changing the direction of work vehicle 200. In the same or other examples, method 750 comprises (block 756)

preparing recharge vehicle 230 to disconnect from work vehicle 200. For example, this operation may involve repositioning, slowing down, stopping various operations, and/or changing the direction of recharge vehicle 230. Specifically, work-vehicle controller 204 recharge-vehicle controller 234 may use work-vehicle sensors 218 and/or recharge-vehicle sensors 248 to assess the environment and to position work vehicle 200 and recharge vehicle 230 relative to each other and also relative to the environment. For example, work-vehicle controller 204 may use work-vehicle communication system 216, while recharge-vehicle controller 234 may use recharge-vehicle communication system 246 to coordinate the movement of work vehicle 200 and recharge vehicle 230. For example, work-vehicle controller 204 may control work-vehicle drive system 210, work-vehicle steering system 212, and work-vehicle braking system 214 to position work vehicle 200. Similarly, recharge-vehicle controller 234 may control recharge-vehicle drive system 240, recharge-vehicle steering system 242, and recharge-vehicle braking system 244 to position recharge vehicle 230.

In some examples, method 750 comprises (block 758) confirming the alignment of work vehicle 200. The alignment confirmation is transmitted to recharge vehicle 230 using, e.g., work-vehicle communication system 216. Similarly, in some examples, method 750 comprises (block 760) confirming the alignment of recharge vehicle 230. The alignment confirmation is transmitted to work vehicle 200 using, e.g., recharge-vehicle communication system 246. In other words, work vehicle 200 and recharge vehicle 230 confirm with each other on successively aligning to start disconnecting their respective charging ports.

In some examples, method 750 comprises (block 762) operating work-vehicle charging port 224. For example, work-vehicle charging port 224 is retracted into the body of work vehicle 200. In the same or other examples, method 750 comprises (block 764) operating recharge-vehicle charging port 254. For example, recharge-vehicle charging port 254 is retracted into the body of recharge vehicle 230. Specifically, recharge-vehicle charging port 254 can be supported on charging port support 255, which can be a telescopic extender. For example, the telescopic extender may extend outside the system covering the flexible cable and connect to the charging plug, which is connected at the end of the flexible cable. In these examples, method 750 can comprise (block 766) establishing that recharge-vehicle charging port 254 is secured by this telescopic extender. Once secured, recharge-vehicle charging port 254 can be retracted from work-vehicle charging port 224.

In some examples, method 750 comprises (block 768) disconnecting recharge-vehicle charging port 254 from work-vehicle charging port 224, e.g., by (block 770) retracting recharge-vehicle charging port 254 from work-vehicle charging port 224.

In some examples, method 750 comprises (block 772) confirming the disconnect completion to recharge vehicle 230 (by work vehicle 200), e.g., that work-vehicle charging port 224 is successfully disconnected from recharge-vehicle charging port 254. At this point, work vehicle 200 can proceed with its own navigation. Similarly, in some examples, method 750 comprises (block 774) confirming the disconnect completion to work vehicle 200 (by recharge vehicle 230), e.g., that recharge-vehicle charging port 254 is successfully disconnected from work-vehicle charging port 224. At this point, recharge vehicle 230 can proceed with its own navigation. For example, recharge vehicle 230 can propel to charging station 283, e.g. if recharge-vehicle SOC 281 is below a set threshold. Alternatively, recharge vehicle 230 may travel to recharge another work vehicle.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered illustrative and not restrictive.

What is claimed is:

1. A method of remote charging of a work vehicle, comprising a work-vehicle power storage, front wheels, and rear wheels, using a recharge vehicle, comprising a front axle, and a rear axle, and a recharge-vehicle power storage, the method comprising:
   receiving a work-vehicle state of charge of the work-vehicle power storage;
   determining charging-start time and charging-start location, for charging the work-vehicle power storage, based on at least the work-vehicle state of charge;
   dispatching the recharge vehicle to the charging-start location by the charging-start time;
   forming an electrical connection between the work vehicle and the recharge vehicle at the charging-start time and at the charging-start location;
   charging the work-vehicle power storage from the recharge-vehicle power storage through the electrical connection,
      wherein the work vehicle moves synchronously with and behind the recharge vehicle,
      wherein the work vehicle sends driving input directly to the recharge-vehicle steering system for steering the front axle of the recharge vehicle while the work-vehicle power storage is being charged from the recharge-vehicle power storage, and
      wherein the front wheels of the work vehicles are steered based on the driving input and after a set delay in response to steering of the front axle of the recharge vehicle; and
   interrupting the electrical connection between the work vehicle and the recharge vehicle.

2. The method of claim 1, wherein the charging-start time and the charging-start location are determined further based on at least one of a work-vehicle current location of the work vehicle, a recharge-vehicle current location of the recharge vehicle, a recharge-vehicle state of charge of the recharge-vehicle power storage, and a work-vehicle operating schedule of the work vehicle.

3. The method of claim 1, wherein receiving the work-vehicle state of charge and determining the charging-start time and the charging-start location is performed at an external vehicle controller, communicatively coupled to at least one of the work vehicle and the recharge vehicle.

4. The method of claim 1, wherein receiving the work-vehicle state of charge and determining the charging-start time and the charging-start location is performed at the recharge vehicle.

5. The method of claim 1, further comprising forming a direct communication channel between the work vehicle and the recharge vehicle at least prior to forming the electrical connection between the work vehicle and the recharge vehicle.

6. The method of claim 5, wherein:
the direct communication channel is formed before receiving the work-vehicle state of charge of the work-vehicle power storage; and
the work-vehicle state of charge is received at the recharge vehicle through the direct communication channel.

7. The method of claim 5, wherein the direct communication channel is used to transfer at least one of a work-vehicle current location of the work vehicle, a work-vehicle steering input of the work vehicle, a work-vehicle speed of the work vehicle, and electrical connection instruction for forming the electrical connection between the work vehicle and the recharge vehicle.

8. The method of claim 7, wherein the work-vehicle current location comprises a relative location of the work vehicle to the recharge vehicle.

9. The method of claim 8, wherein the relative location of the work vehicle to the recharge vehicle is determined using at least one of work-vehicle sensors of the work vehicle and recharge-vehicle sensors of the recharge vehicle.

10. The method of claim 8, wherein the relative location of the work vehicle to the recharge vehicle is continuously updated while forming the electrical connection and charging the work-vehicle power storage.

11. The method of claim 1, wherein the work vehicle and the recharge vehicle synchronously move while forming the electrical connection between the work vehicle and the recharge vehicle at the charging-start time and at the charging-start location.

12. The method of claim 1, wherein a work-vehicle track of the work vehicle overlaps with a recharge-vehicle track of the recharge vehicle when the work vehicle and the recharge vehicle synchronously move while charging the work-vehicle power storage from the recharge-vehicle power storage.

13. The method of claim 1, wherein:
the work vehicle is a human-controlled vehicle;
the recharge vehicle is an autonomous vehicle; and
the recharge-vehicle steering system of the recharge vehicle is directly controlled based on driver input to a work-vehicle steering system of the work vehicle while the recharge vehicle moves in front of the work vehicle.

14. The method of claim 1, wherein:
each of the work vehicle and the recharge vehicle is an autonomous vehicle; and
movement of the work vehicle is based on the movement of the recharge vehicle while the recharge vehicle moves in front of the work vehicle.

15. The method of claim 14, wherein the movement of the work vehicle corresponds to the movement of the recharge vehicle with a set delay determined based on speed and size of the work vehicle and the recharge vehicle.

16. The method of claim 1, wherein receiving the work-vehicle state of charge and determining the charging-start time and the charging-start location are repeated one or more times before forming the electrical connection.

17. The method of claim 1, wherein the work vehicle is one of farming equipment and construction equipment.

18. The method of claim 1, wherein the work vehicle is a tractor.

19. The method of claim 18, wherein the work vehicle operates a tractor implement while the work vehicle moves synchronously with and behind the recharge vehicle.

20. A vehicle charging system comprising:
a work vehicle comprising a work-vehicle power storage, a work-vehicle communication system, a work-vehicle charging port, front wheels, and rear wheels; and
a recharge vehicle comprising:
a front axle,
a rear axle
a recharge-vehicle power storage,
a recharge-vehicle communication system configured to communicate with the work-vehicle communication system,
a recharge-vehicle charging port, configured to form an electrical connection with the work-vehicle charging port and transmit electrical power from the recharge-vehicle power storage to the work-vehicle power storage while the work vehicle and the recharge vehicle synchronously move relative to each other, and
a recharge-vehicle steering system configured to receive driving input directly from the work vehicle for steering at least one of the front axle and the rear axle of the recharge vehicle while the work-vehicle power storage is being charged from the recharge-vehicle power storage and while the work vehicle moves synchronously with and behind the recharge vehicle,
wherein the front wheels of the work vehicles are steered based on the driving input and after a set delay in response to steering of the front axle of the recharge vehicle.

* * * * *